(12) United States Patent
Wijaya et al.

(10) Patent No.: US 10,481,304 B2
(45) Date of Patent: Nov. 19, 2019

(54) LENS SHEET, METHOD OF FORMING LENS SHEET, AUGMENTED REALITY DEVICE AND SYSTEM

(71) Applicant: Panasonic Intellectual Property Management Co., Ltd., Osaka (JP)

(72) Inventors: Chandra Suwandi Wijaya, Singapore (SG); Jovia Jia Zhen Lee, Singapore (SG)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 262 days.

(21) Appl. No.: 15/634,071

(22) Filed: Jun. 27, 2017

(65) Prior Publication Data

US 2018/0372923 A1 Dec. 27, 2018

(51) Int. Cl.
*G02B 27/10* (2006.01)
*G02B 3/00* (2006.01)
*G02B 27/01* (2006.01)
*G02B 5/04* (2006.01)
*G02B 27/22* (2018.01)
*G02B 27/00* (2006.01)

(52) U.S. Cl.
CPC ............. *G02B 3/005* (2013.01); *G02B 5/045* (2013.01); *G02B 27/0093* (2013.01); *G02B 27/0101* (2013.01); *G02B 27/0179* (2013.01); *G02B 27/2214* (2013.01); *G02B 2003/0093* (2013.01); *G02B 2027/011* (2013.01); *G02B 2027/0132* (2013.01); *G02B 2027/0134* (2013.01); *G02B 2027/0187* (2013.01)

(58) Field of Classification Search
CPC .... G02B 3/005; G02B 5/045; G02B 27/0093; G02B 27/2214; G02B 27/0101; G02B 27/0179
See application file for complete search history.

(56) References Cited

U.S. PATENT DOCUMENTS

| 2007/0052703 A1 | 3/2007 | Seto |
| 2015/0177608 A1* | 6/2015 | Nelson ................. H04N 13/363 359/449 |
| 2016/0084661 A1 | 3/2016 | Gautama et al. |
| 2016/0086305 A1 | 3/2016 | Watanabe |

* cited by examiner

*Primary Examiner* — Joseph P Martinez
(74) *Attorney, Agent, or Firm* — McDermott Will & Emery LLP

(57) ABSTRACT

According to various embodiments, there is provided a lens sheet including an array of lenses arranged parallel to each other. Each lens includes a light redirecting portion having a light incident surface and a light reflecting surface, and includes a light refracting portion. The light reflecting surface is slanted relative to the light incident surface and relative to a plane interfacing the light redirecting portion and the light refracting portion, such that light of a first view image and light of a second view image transmitted through the light incident surface into the lens are directed to a first region and a second region of the light reflecting surface respectively and are reflected to the light refracting portion by the light reflecting surface. The first region is next to the second region. The light refracting portion is configured to refract the light of the first view image to a first view region and refract the light of the second view image to a second view region spaced apart from the first view region.

15 Claims, 19 Drawing Sheets ved a method of forming a lens sheet including an array of

LENS SHEET, METHOD OF FORMING LENS SHEET, AUGMENTED REALITY DEVICE AND SYSTEM

TECHNICAL FIELD

The present invention relates to a lens sheet and a method of forming the same, as well as an augmented reality device and an augmented reality system.

BACKGROUND

A head-up display (HUD) is a computer-operated system that presents significant information or visual images to a user's focal view. The head-up display presents data on a transparent display, enhancing a driver's driving capability by fulfilling the requirements for safety, comfort, and information.

Head-up displays can use different types of displays. FIG. 1A illustrates an example of a head-up display 100, which uses a windscreen 102 of a vehicle for displaying information or visual images. FIG. 1B illustrates another example of a head-up display 150, in which a combiner display 152 is included to display information or visual images thereon. The combiner display 152 is usually an angled flat piece of glass located in front of the viewer.

A head-mounted display (HMD) is another type of head-up displays, and uses a display element moving with the orientation of the user's head.

When used for augmented reality applications, a head-up display may be referred to as an augmented reality (AR) HUD system which shows exterior view of traffic conditions in front of the vehicle with virtual information or augmented information for the driver. Augmented reality head-up displays thus incorporate augmented information as part of the driving experience.

However, current head-up displays present information or images with distortions. Head-up displays present the image relatively close to the driver, whereas the driver usually focuses his sight much further beyond the windscreen. This difference in eye focus and image angle causes distortion, and image may thus appear split as shown in image 200 of FIG. 2.

To reduce the image distortion, some approaches use mirror reflections in a projector unit of the head-up display to put the image "floating" beyond the windscreen. This mirror reflection approach could not completely eliminate the image distortion. At the same time, it will be difficult to place overlaying augmented information accurately on the objects on the road.

SUMMARY

According to various embodiments, there is provided a lens sheet including an array of lenses arranged parallel to each other. Each lens includes a light redirecting portion having a light incident surface and a light reflecting surface, and includes a light refracting portion. The light reflecting surface is slanted relative to the light incident surface and relative to a plane interfacing the light redirecting portion and the light refracting portion, such that light of a first view image and light of a second view image transmitted through the light incident surface into the lens are directed to a first region and a second region of the light reflecting surface respectively and are reflected to the light refracting portion by the light reflecting surface. The first region is next to the second region. The light refracting portion is configured to refract the light of the first view image to a first view region and refract the light of the second view image to a second view region spaced apart from the first view region.

According to various embodiments, there may be provided a method of forming a lens sheet including an array of lenses. The method may include providing a substrate, and forming the array of lenses at least partially in the substrate. The array of lenses is parallel to each other. Each lens includes a light redirecting portion having a light incident surface and a light reflecting surface, and includes a light refracting portion. The light reflecting surface is slanted relative to the light incident surface and relative to a plane interfacing the light redirecting portion and the light refracting portion, such that light of a first view image and light of a second view image transmitted through the light incident surface into the lens are directed to a first region and a second region of the light reflecting surface respectively and are reflected to the light refracting portion by the light reflecting surface. The first region is next to the second region. The light refracting portion is configured to refract the light of the first view image to a first view region and refract the light of the second view image to a second view region spaced apart from the first view region.

According to various embodiments, there may be provided an augmented reality device, including a display screen and an array of lens parallel to each other and arranged on a surface of the display screen. Each lens includes a light redirecting portion including a light incident surface and a light reflecting surface, and includes a light refracting portion. The light reflecting surface is slanted relative to the light incident surface and relative to a plane interfacing the light redirecting portion and the light refracting portion, such that light of a first view image and light of a second view image transmitted through the light incident surface into the lens are directed to a first region and a second region of the light reflecting surface respectively and are reflected to the light refracting portion by the light reflecting surface. The first region is next to the second region. The light refracting portion is configured to refract the light of the first view image to a first view region and refract the light of the second view image to a second view region spaced apart from the first view region.

According to various embodiments, there may be provided an augmented reality system. The augmented reality system may include a lens sheet including an array of lens parallel to each other. Each lens includes a light redirecting portion including a light incident surface and a light reflecting surface, and includes a light refracting portion. The light reflecting surface is slanted relative to the light incident surface and relative to a plane interfacing the light redirecting portion and the light refracting portion, such that light of a first view image and light of a second view image transmitted through the light incident surface into the lens are directed to a first region and a second region of the light reflecting surface respectively and are reflected to the light refracting portion by the light reflecting surface. The first region is next to the second region. The light refracting portion is configured to refract the light of the first view image to a first view region and refract the light of the second view image to a second view region spaced apart from the first view region. The augmented reality system may further include a projector configured to project the light of the respective first view image and the light of the respective second view image to a respective selected lens of the array of lenses; a processor configured to determine the respective first view image, the respective second view image and the respective selected lens based on eye positions of a driver; and a sensor configured to detect the eye positions of the driver.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments are described with reference to the following drawings, in which.

DESCRIPTION

Various embodiments provide a lens sheet and a method of forming a lens sheet, as well as an augmented reality device and an augmented reality system.

Embodiments described below in context of the lens sheet are analogously valid for the respective method and augmented reality device and augmented reality system, and vice versa. Furthermore, it will be understood that the embodiments described below may be combined, for example, a part of one embodiment may be combined with a part of another embodiment.

It will be understood that any property described herein for a lens sheet may also hold for any lens sheet described herein. It will be understood that any property described herein for a specific method may also hold for any method described herein. It will be understood that any property described herein for an augmented reality device and an augmented reality system may also hold for any augmented reality device and any augmented reality system described herein. Furthermore, it will be understood that for any lens sheet or method or augmented reality device or augmented reality system described herein, not necessarily all the components or steps described must be enclosed in the lens sheet or method or augmented reality device or augmented reality system, but only some (but not all) components or steps may be enclosed.

In the specification the term "comprising" shall be understood to have a broad meaning similar to the term "including" and will be understood to imply the inclusion of a stated integer or step or group of integers or steps but not the exclusion of any other integer or step or group of integers or steps. This definition also applies to variations on the term "comprising" such as "comprise" and "comprises".

The term "coupled" (or "connected") herein may be understood as electrically coupled, or as optically coupled, or as mechanically coupled, for example attached or fixed, or just in contact without any fixation, and it will be understood that both direct coupling or indirect coupling (in other words: coupling without direct contact) may be provided.

In order that various embodiments may be readily understood and put into practical effect, particular embodiments will now be described by way of examples and not limitations, and with reference to the figures.

Figure 1A:
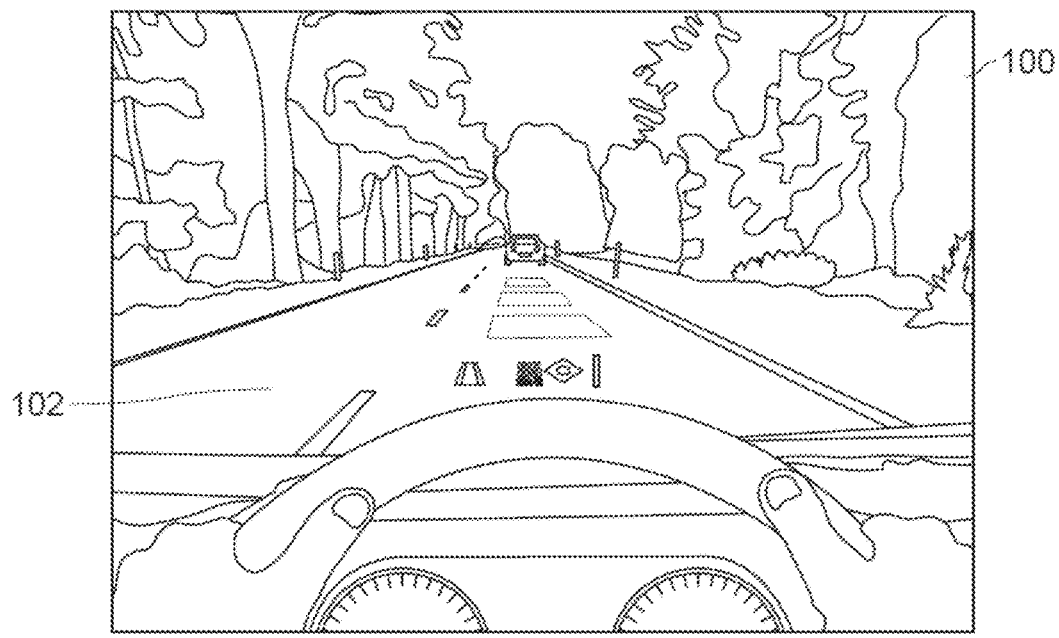
FIG. 1A and FIG. 1B show examples of a display screen of a head-up display.
Figure 1B:
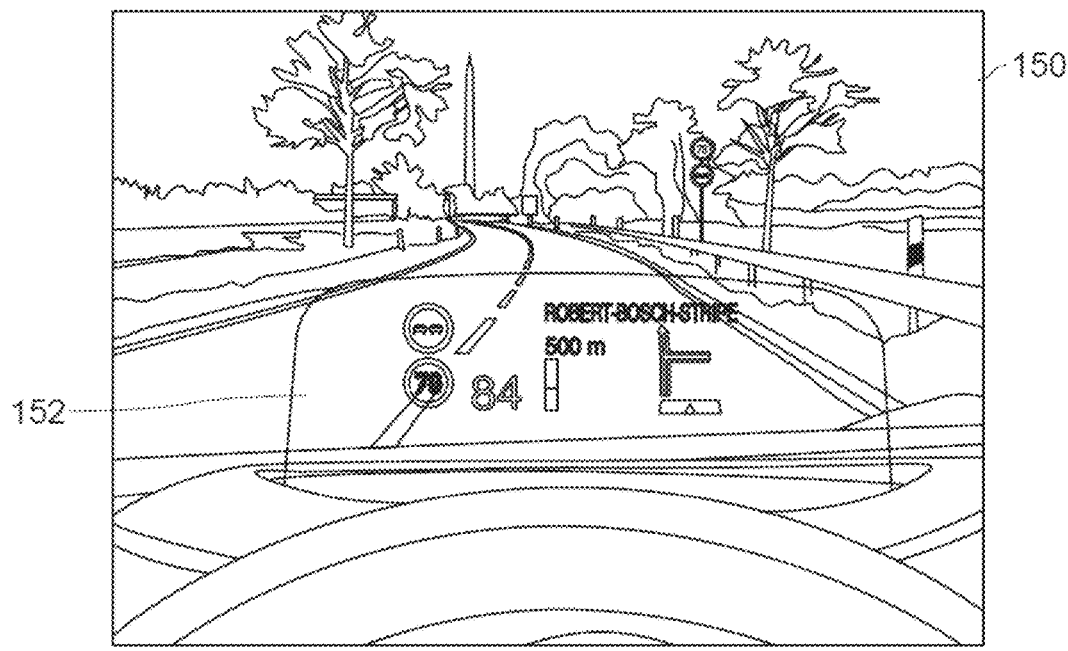
Figure 2:
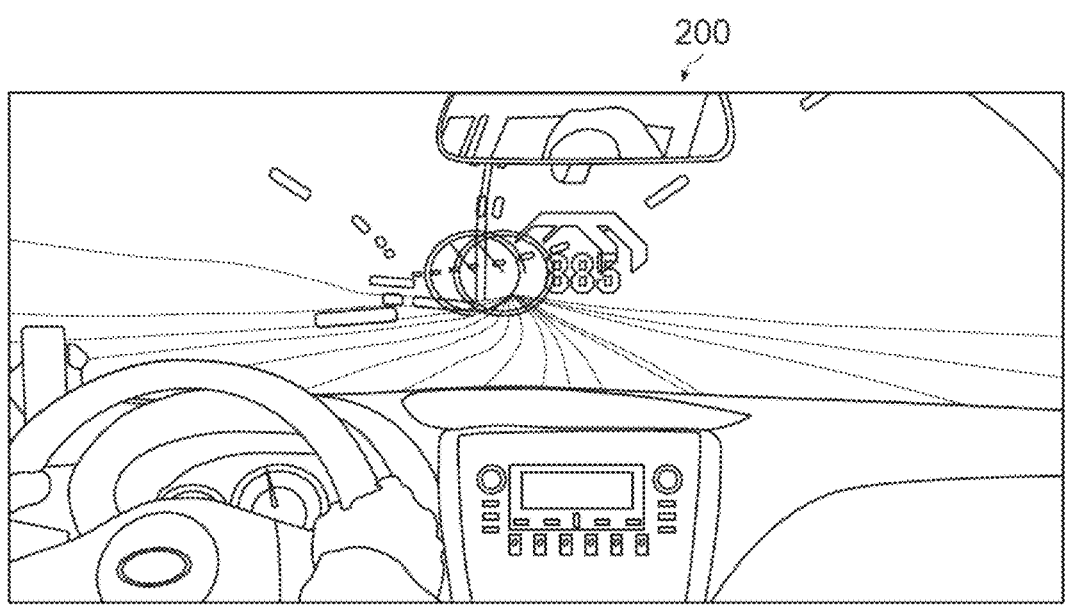
FIG. 2 illustrates image distortion shown on a display screen of a head-up display.
Figure 3:
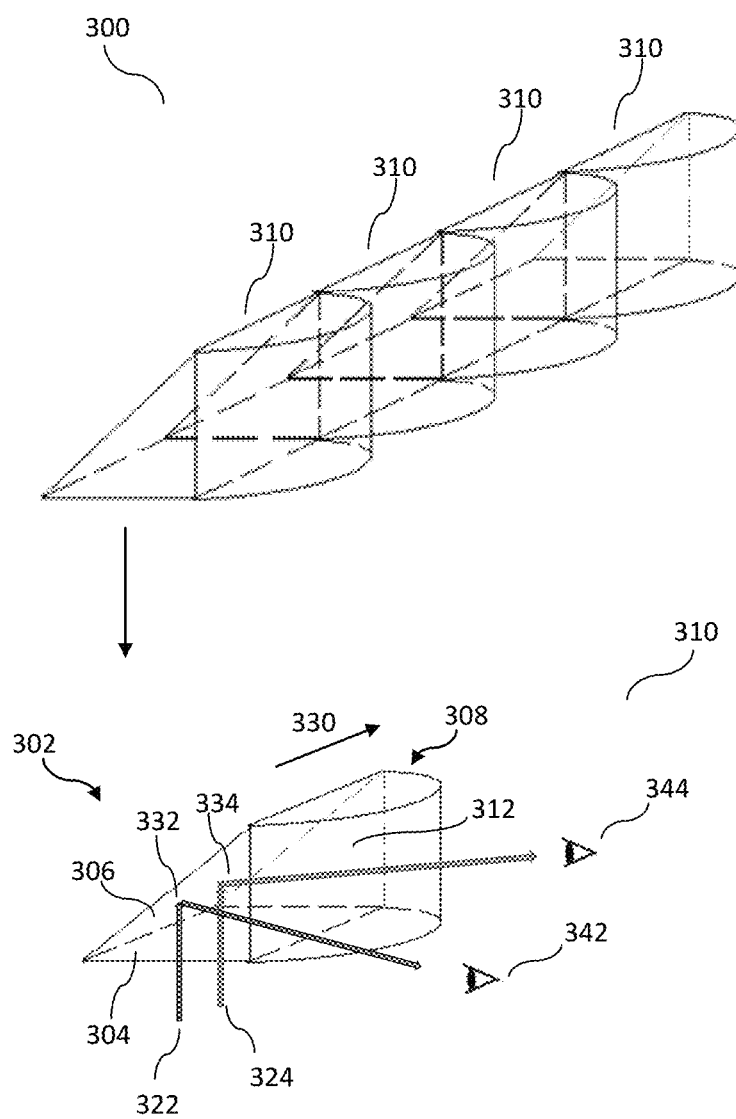
FIG. 3 shows a conceptual diagram of a lens sheet in a perspective view according to various embodiments.

FIG. 3 shows a conceptual diagram of a lens sheet 300 in a perspective view according to various embodiments. The lens sheet includes an array of lenses 310 arranged parallel to each other. In a perspective view of a single lens shown in FIG. 3, each lens 310 includes a light redirecting portion 302 having a light incident surface 304 and a light reflecting surface 306, and includes a light refracting portion 308. The light reflecting surface 306 is slanted relative to the light incident surface 304 and relative to a plane 312 interfacing the light redirecting portion 302 and the light refracting portion 308, such that light 322 of a first view image and light 324 of a second view image transmitted through the light incident surface 304 into the lens 310 are directed to a first region 332 and a second region 334 of the light reflecting surface 306 respectively and are reflected to the light refracting portion 308 by the light reflecting surface 306. The first region 332 is next to the second region 334. The light refracting portion 308 is configured to refract the light 322 of the first view image to a first view region 342 and refract the light 324 of the second view image to a second view region 344 spaced apart from the first view region 342.

In other words, according to various embodiments, the lens 310 of the lens sheet 300 has the light incident surface 304 and the plane 312 interfacing the light redirecting portion 302 and the light refracting portion 308 slanted relative to the light reflecting surface 306, such that the incident light from the light reflecting surface 306 is reflected to the light refracting portion 308. Accordingly, the light incident surface 304 and the light refracting portion 308 are arranged at the same side of the light reflecting surface 306, so as to receive the incident light from and direct the reflected light towards the same side of the light reflecting surface 306. In addition, the light refracting portion 308 is configured to refract the reflected light of different view images to different view regions, such that eyes of a viewer positioned at different view regions are able to see different view images. According to various embodiments, the light refracting portion 308 is configured such that the light 322 of the first view image reflected from the first region 332 of the light reflecting surface is refracted to the first view region 342, and the light 324 of the second view image reflected from the second region 334 of the light reflecting surface is refracted to the second view region 344. In other words, one eye of a viewer positioned at the first view region 342 can see the light 322 of the first view image. Similarly, the other eye of the viewer positioned at the second view region 344 can see the light 324 of the second view image. Thus, each eye of the viewer views a different image or a different set of images. In this manner, when different view images are provided as a left eye image and a right eye image of a stereo pair, depth perception is created and 3D (three-dimensional) illusion is achieved through the lens sheet 300.

In this context, the plane interfacing the light redirecting portion and the light refracting portion, for example, the plane 312 shown in FIG. 3 and the planes 812, 912, 1012, 1112 shown in FIGS. 8A-11B below, may be a conceptual or virtual plane in the embodiments wherein the light redirecting portion and the light refracting portion are integrally formed, or may be an interface or adjoining plane in the embodiments wherein the light redirecting portion and the light refracting portion are separately formed and attached together.

The first region 332 is next to the second region 334, which may refer to that the first region 332 and the second region 334 are located side by side or adjacent to each other, with or without space therebetween. In the embodiments as shown in FIG. 3, the first region 332 is next to the second region 334 laterally, for example, along a horizontal direction 330. The second view region 344 is spaced apart from the first view region 342, which may refer to that the first view region 342 and the second view region 344 are arranged with space therebetween. According to various embodiments, the first view region 342 and the second view region 344 are spaced apart along the same direction, along which the first region 332 and the second region 334 are arranged. For example, the first view region 342 and the second view region 344 are spaced apart laterally, for example, along the horizontal direction 330 as shown in FIG. 3.

It is understood that the light paths of the lights 322, 324 shown in FIG. 3 are for illustrative purposes only, and may not represent the actual light paths of the lights 322, 324.

In this context, the array of lenses 310 arranged parallel to each other may refer to that the respective light redirecting portions 302 of the lenses 310 are parallel to each other. The respective light incident surfaces 304 of the lenses 310 are parallel to each other, and the respective light reflecting surfaces 306 of the lenses 310 are parallel to each other. Further, the respective light refracting portions 308 of the lenses 310 are parallel to each other. In this context, the term "parallel" shall be understood to include substantially parallel, which may have a margin or slight departure (e.g. less than 1°, e.g., about 0.5°) from a perfect parallel arrangement.

According to various embodiments, through the light refracting portion 308, a line of sight of one eye of a viewer positioned at the first view region 342 is focused onto the first region 332 of the light reflecting surface, and a line of sight of the other eye of the viewer positioned at the second view region 344 is focused onto the second region 334 of the light reflecting surface.

According to various embodiments, the light refracting portion 308 may include a convex surface configured to refract the light 322 of the first view image reflected from the first region 332 of the light reflecting surface to the first view region 342, and refract the light 324 of the second view image reflected from the second region 334 of the light reflecting surface to the second view region 344. In this context, the convex surface may protrude in an outward direction away from the light redirecting portion and away from the plane interfacing the light redirecting portion and the light refracting portion. According to various embodiments, the light 322 of the first view image and the light 324 of the second view image are reflected onto different regions of the convex surface of the light refracting portion 308.

According to various embodiments, the convex surface may be a curved surface, for example, a curved surface of a partial cylinder 308 as shown in FIG. 3, or a curved surface shown in the embodiments of FIGS. 10A-11B below. In other embodiments, the convex surface may be formed of a plurality of planar surfaces adjoining each other, with an angle of 0°-180° (excluding 0° and 180°) between the adjacent planar surfaces, for example, as will described in the embodiments of FIGS. 8A-9C below.

According to other embodiments, instead of using a convex surface in the light refracting portion 308 for refracting the light reflected onto different regions of the convex surface to different view regions 342, 344, the light refracting portion 308 may be configured with a variation of refractive index across the light refracting portion 308, so as to refract the light reflected onto different regions of the light refracting portion 308 to different view regions 342, 344. According to further embodiments, the light refracting portion 308 may be configured with both a variation of refractive index and a surface shape (e.g. convex shape), such that light reflected onto different regions of the light refracting portion 308 can be refracted to different view regions 342, 344.

In an exemplary embodiment, the light incident surface 304 is perpendicular to the light refracting portion 308, for example, perpendicular to the convex surface of the light refracting portion 308. The term "perpendicular" may include substantially perpendicular with a margin or slight departure (e.g. less than 1°, e.g., about 0.5°) from a perfect perpendicular arrangement. The incident angle of the light 322, 324 may be 0° or within a margin of less than 1°. The reflecting surface 306 may be slanted relative to the light incident surface 304 at an angle of about 45° (for example, within a margin of less than 1° around 45°). Accordingly, the reflecting surface 306 reflects the light 322, 324 along a horizontal direction towards the light refracting portion 308 as shown in FIG. 3. It is understood that in various embodiments, the relative arrangement among the light incident surface 304, the light reflecting surface 306 and the light refracting portion 308, as well as the incident angle of incident light may be configured and adjusted accordingly, such that the incident light can be redirected to the light refracting portion 308.

In various embodiments, the light refracting portion 308 may be a lens portion in at least one of a partially cylindrical shape, a partially polygonal prism shape, a triangular prism shape, or a partially spherical shape. Although the lens sheet 300 of FIG. 3 illustrates the light refracting portion 308 in a partially cylindrical shape, it is understood that the lens sheets of various embodiments may include lenses having their light refracting portions in various other suitable shapes, for example, as illustrated in the embodiments of FIGS. 8A-11B below. The partially cylindrical shaped lens portion 308 in the embodiments shown in FIG. 3 may be referred to as a lenticular lens. In this context, the partially cylindrical shape may include a semi-cylindrical lens portion, or may include part of a right circular cylinder, or part of a right elliptic cylinder, or part of an oblique cylinder.

Figure 11A:
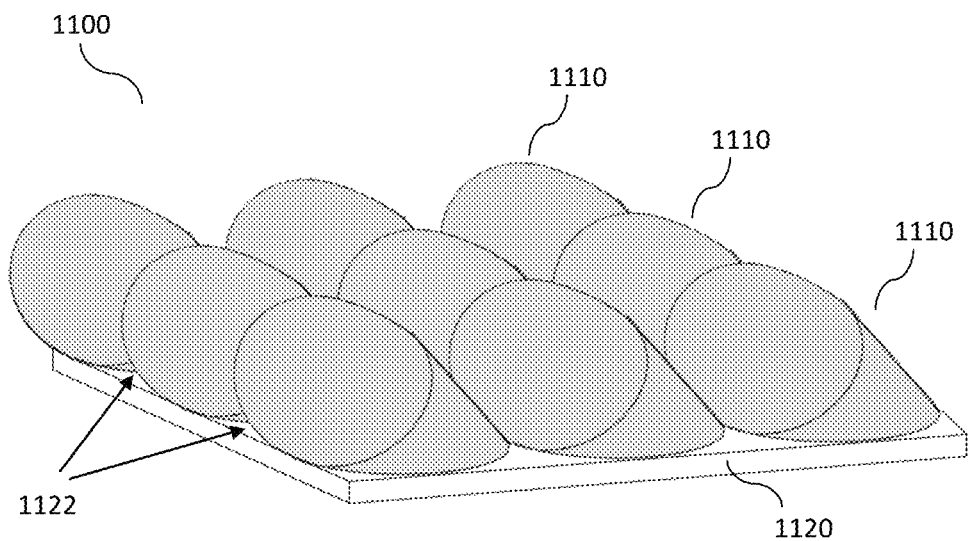
FIG. 11A shows a conceptual diagram of a lens sheet in a side view according to various embodiments.
Figure 11B:
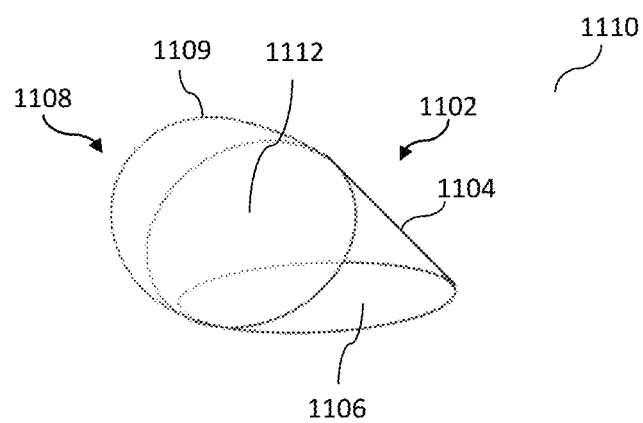
FIG. 11B shows a conceptual diagram of a single lens in a perspective view according to various embodiments.

In various embodiments, the light reflecting surface may be at least one of a square surface, a rectangular surface, a polygonal surface, a circular surface, or an elliptic surface. Although the lens sheet 300 of FIG. 3 illustrates the light reflecting surface 306 in the form of a square surface or a rectangular surface, it is understood that the lens sheets of various embodiments may include lenses having their light reflecting surfaces in various other suitable shapes, for example, as illustrated in the embodiments of FIGS. 11A and 11B below.

According to the embodiments illustrated in FIG. 3, the light redirecting portion 302 may be in the form of a triangular prism, and the light refracting portion 308 may be in the form of a semi-cylinder abutting or adjoining a surface of the light redirecting portion 302. It is understood that the light redirecting portion 302 and the light refracting portion 308 may be integrally formed, or may be separately formed and adjoined together.

According to various embodiments, the light reflecting surfaces 306 of the lenses 310 extend along a plane of the lens sheet 300, and the light incident surfaces 304 and the light refracting portions 308 of the lenses 310 protrude from the plane of the lens sheet. In other words, the lens sheet 300 may be formed such that the light reflecting surfaces 306 are arranged in or on the same plane, which may be a planar surface of a substrate, for example.

According to various embodiments, the array of lenses 310 may be arranged next to each other, such that adjacent lenses 310 abut or adjoin each other, as shown in FIG. 3. In other embodiments, the array of lenses may be arranged with space between each other, for example, as shown in the embodiment of FIGS. 11A and 11B below.

According to various embodiments, the lens 310 may be a microlens, also referred to as a lenslet, which is a small lens having dimensions between 10 μm and 1000 μm. The array of lenses may also be referred to as a microlens array, or a lenslet array. In other embodiments, the lens 310 may have dimensions in the nanoscale ranging from 1 to 100 nm. The lens sheet 300 including the nanoscale lenses 310 may be referred to as a nanosheet or a nanofilm with thickness in a scale ranging from 1 to 100 nm.

In the embodiments shown in FIG. 3, the lenses 310 are arranged in a one-dimensional array, for example, in a row along a horizontal direction, with the light incident surfaces 304 of the lenses arranged on the same plane. It is understood that the array of lenses 310 may be arranged in other forms in other embodiments, as will be illustrated in FIGS. 5-7B below.

The autostereoscopy which can be achieved by the lens sheet 300 of various embodiments in this description are described in more detail below.

Figure 4:
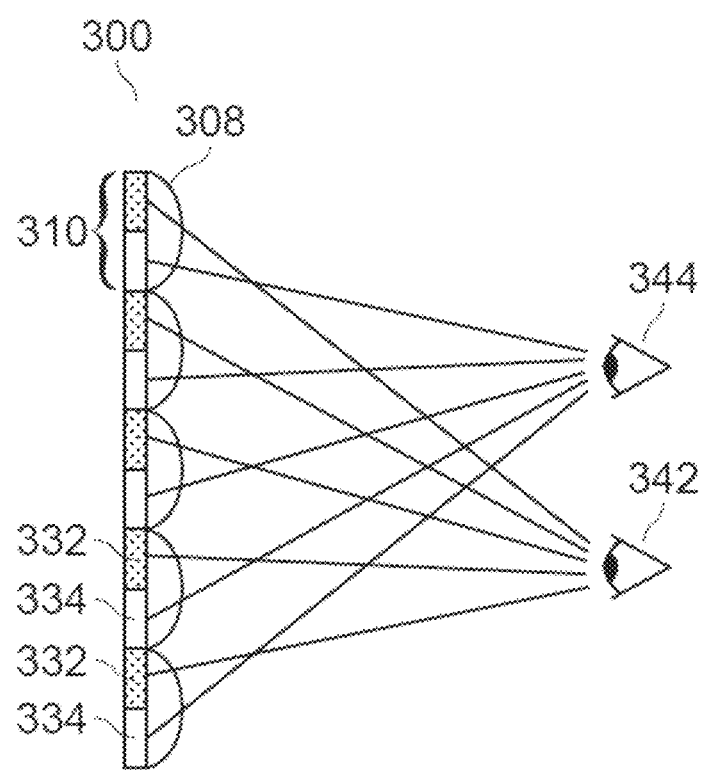
FIG. 4 shows a top view of a lens sheet of FIG. 3 according to various embodiments

FIG. 4 shows a top view of the lens sheet 300 according to various embodiments. As shown in FIG. 4, light reflected from the first regions 332 of the lenses is refracted to the first viewing region 342 through the respective refracting portions 308, and light reflected from the second regions 334 of the lenses is refracted to the second viewing region 344 through the respective refracting portions 308. The first region 332 is next to the second region 334 in each lens, and the first viewing region 342 and the second viewing region 344 are spaced apart from each other along the same direction along which the first regions 332 and the second regions 334 are arranged. In this manner, when a viewer's left eye and right eye are respectively located at the first viewing region 342 and the second viewing region 344, the first view image (e.g. left eye image or left view image) is seen by the left eye and the second view image (e.g. right eye image or right view image) is seen by the right eye, thereby achieving an autostereoscopic effect.

According to various embodiments, the light refracting portion 308 is configured such that the light 322 of the first view image reflected from the first region 332 of the light reflecting surface is refracted to the first view region 342, and the light 324 of the second view image reflected from the second region 334 of the light reflecting surface is refracted to the second view region 344. In other words, one eye of a viewer positioned at the first view region 342 can see the light 322 of the first view image. Similarly, the other eye of the viewer positioned at the second view region 344 can see the light 324 of the second view image. Thus, each eye of the viewer views a different image or a different set of images. In this manner, when different view images are provided as a left eye image and a right eye image of a stereo pair, depth perception is created and 3D (three-dimensional) illusion is achieved through the lens sheet 300.

According to various embodiments, the light refracting portion 308 may be configured, for example, by configuring the curvature or protruding angle of the convex surface of the light refracting portion 308, to adjust the viewing angle of the light refracting portion 308, so that the distance between the first viewing region 342 and the second view region 344 is substantially the same (including "equal", and "substantially equal" with a difference margin of less than 10%) as the distance between the left eye and the right eye of the viewer.

According to various embodiments, a stereo pair including a left eye image (also referred to as left view image) and a right eye image (also referred to as right view image) of the same scene may be provided. Each of the left eye image and the right eye image may be sliced into a plurality of sub-images, for example, a plurality of strips. In various embodiments, each sub-image may include at least one pixel. In various embodiments, each sub-image may include at least a column of pixels. The number of sub-images of the left or right view image may be the same as the number of lenses for receiving the light of these sub-images. The plurality of sub-images of the left eye image may be directed onto the first regions 332 of the plurality of lenses, respectively. Similarly, the plurality of sub-images of the right eye image may be directed onto the second regions 334 of the plurality of lenses, respectively. The plurality of sub-images of the left eye image and the plurality of sub-images of the right eye image directed onto the plurality of lenses are thus interleaved to form a lenticular image, which when redirected and refracted through the respective light refracting portions 308 of the lenses, are respectively seen by the left eye and the right eye of the viewer. Accordingly, the left eye sees the whole left eye image, and the right eye sees the whole right eye image, thus achieving depth perception and 3D illusion at the viewer's side.

Figure 5:
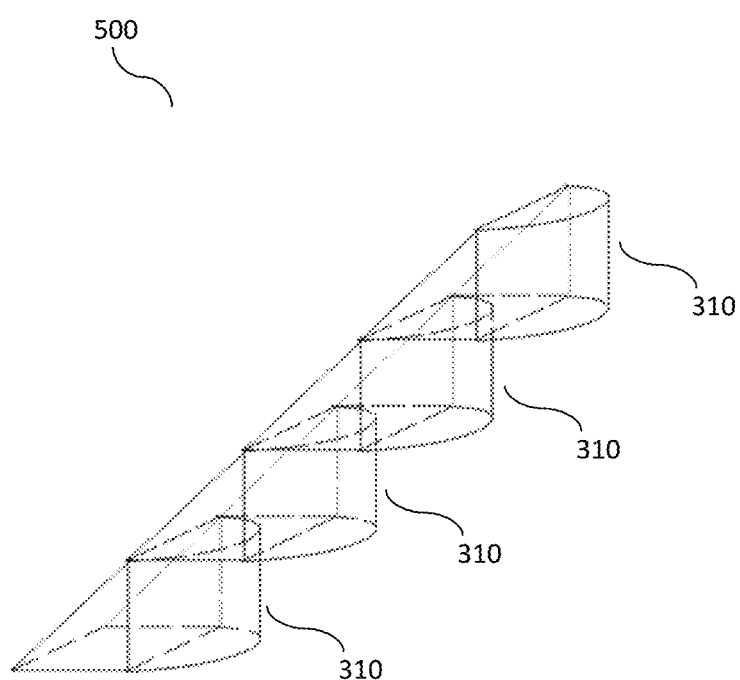
FIG. 5 shows a conceptual diagram of a lens sheet in a perspective view according to various embodiments.

FIG. 5 shows a lens sheet 500 in a perspective view according to various embodiments. The lens sheet 500 includes a one-dimensional array of lenses 310 arranged parallel to each other in a column, with the lenses arranged on top of each other. The lenses 310 of the lens sheet 500 may be the lenses 310 described in various embodiments above. Various embodiments described with reference to FIG. 3 and FIG. 4 above hold valid for the embodiments of FIG. 5, and vice versa.

Figure 6A:
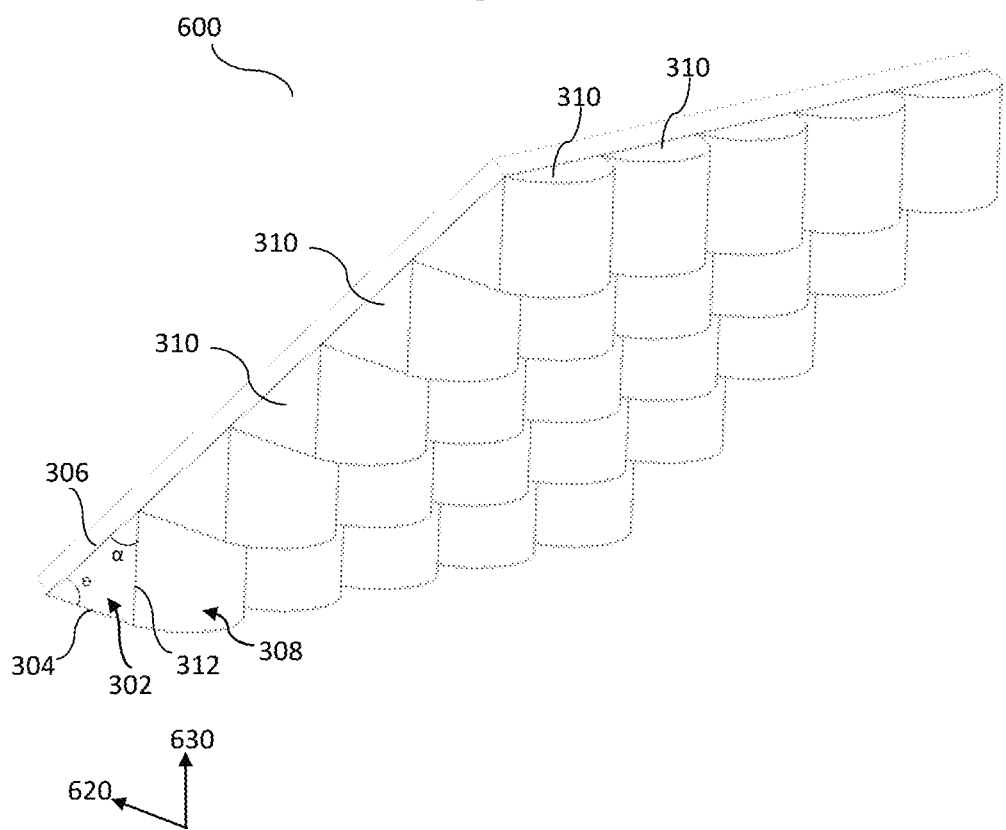
FIG. 6A shows a conceptual diagram of a lens sheet in a perspective view according to various embodiments.

FIG. 6A shows a lens sheet 600 in a perspective view according to various embodiments. The lens sheet 600 includes the lenses 310 arranged in a two-dimensional array, for example, in rows and columns. The lenses 310 of the lens sheet 600 may be the lenses 310 described in various embodiments above. Various embodiments described with reference to FIG. 3 and FIG. 4 above hold valid for the embodiments of FIG. 6A, and vice versa.

In the embodiments shown in FIG. 6A, the lens sheet 600 is oriented with the light incident surfaces 304 arranged horizontally along a horizontal direction 620, the light refracting portions 308 arranged vertically along a vertical direction 630, and the light reflecting surfaces 306 arranged obliquely. The light refracting portions 308 is arranged vertically, with the plane 312 interfacing the light redirecting portion 302 and the light refracting portion 308 oriented vertically along the vertical direction 630. In this orientation, the light refracting portions 308, for example, the convex surface of the light refracting portion 308, may face the eyes of a viewer.

Figure 6B:
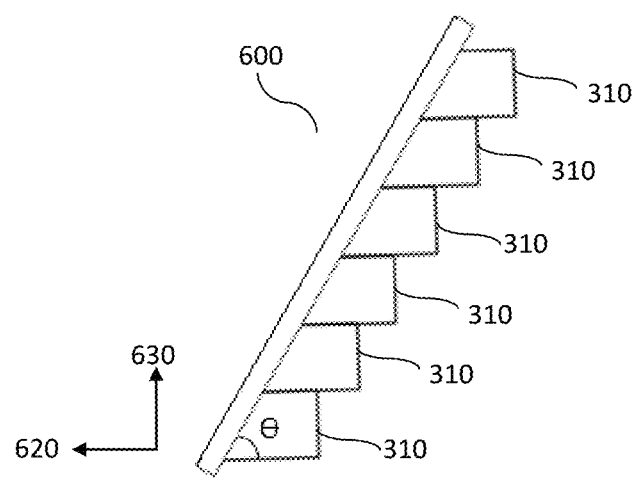
FIG. 6B shows a side view of the lens sheet of FIG. 6A according to various embodiments.

FIG. 6B shows a side view of the lens sheet 600 of FIG. 6A according to various embodiments. As shown in FIG. 6B, the respective lenses 310 are arranged in different rows, such that each row of lenses may correspond to different height of eye positions of different viewers.

An angle θ between the light reflecting surface 306 and the light incident surface 304 is shown in FIGS. 6A and 6B, which may be an acute angle. An angle α between the light reflecting surface 306 and the light refracting portion 308, e.g., the angle between the light reflecting surface 306 and the plane 312 interfacing the light redirecting portion 302 and the light refracting portion 308, is shown in FIG. 6A, which may also be an acute angle. As described above, the angles θ and α can be configured or adjusted accordingly in order to redirect the incident light towards the light refracting portion 308 through the light incident surface 304 and the light reflecting surface 306.

Figure 7A:
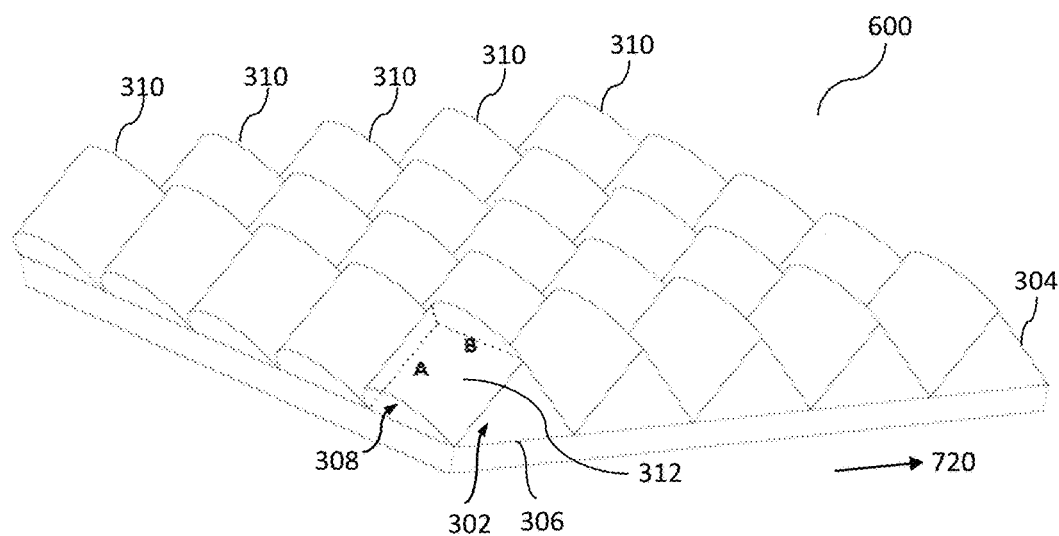
FIG. 7A shows a conceptual diagram of a lens sheet in a perspective view according to various embodiments.
Figure 7B:
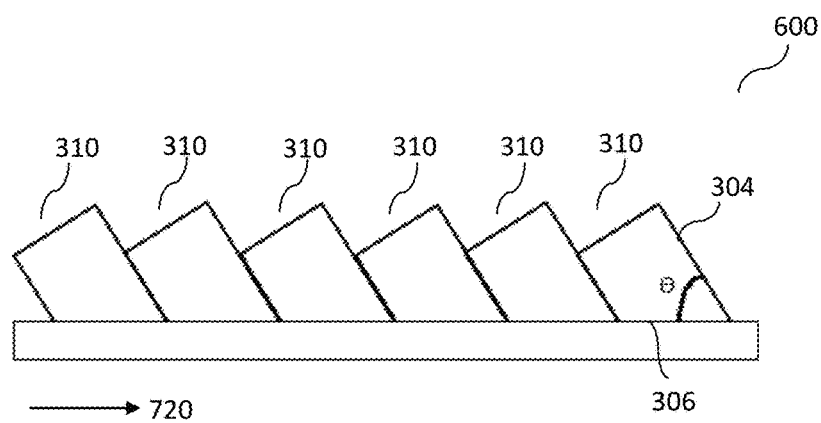
FIG. 7B shows a side view of the lens sheet of FIG. 7A.

FIG. 7A shows a perspective view of the lens sheet 600 of FIG. 6A in a different orientation, and FIG. 7B shows a side view of the lens sheet 600 of FIG. 7A. In this orientation, the light reflecting surfaces 306 of the lenses 310 are oriented horizontally along a horizontal direction 720, which may be a view after manufacturing, e.g. after roll to roll imprinting to form the lenses. Various embodiments described with reference to FIGS. 3-6B above hold valid for the embodiments of FIGS. 7A and 7B, and vice versa.

The light refracting portion 308 of each lens 310 may have a height A and a width B as defined on a surface 312 of the light refracting portion 308 contacting or adjoining the light redirecting portion 302, i.e. the plane 312 interfacing the light redirecting portion 302 and the light refracting portion 308, as illustrated in FIG. 7A. The height A may be equal to the width B, which may include that the height A is substantially equal to the width B with a slight difference, for example, in a margin of less than 10%. Accordingly, the surface 312 of the light redirecting portion 302 adjoining the light refracting portion 308 may be a substantially square surface. In another embodiment, the height A may be different from the width B, i.e., B>A or B<A, for example, B=2A, such that the surface 312 of the light redirecting portion 302 contacting the light refracting portion 308 may be a rectangular surface. In other embodiments, the surface/plane 312 may be a circular plane as shown in FIG. 11B below, or a semi-circular plane, or in any other suitable shapes. According to various embodiments, the dimension of the lens and the shape of the surface 312 may vary, which may relate to the pixel or image shape (whether it is square or rectangle, or circular/semi-circular based on the lens that is used). Illustratively, in the embodiments with a rectangular plane 312, the lens has a rectangular shape when viewed by the viewer/driver. In the embodiments with a square plane 312, the lens has a square shape when viewed by the viewer/driver. This may affect the angle of contact to the lens surface and in turn it will affect the angle of light deflection.

Each lens 310 may be a microlens. In an exemplary embodiment, the height A may be in a range between 20 μm and 1000 μm, e.g., 20 μm, 30 μm, 40 μm, 50 μm, 60 μm, 70 μm, 80 μm, 90 μm, or 100 μm.

In other embodiments, the lens 310 may have dimensions in the nanoscale ranging from 1 to 100 nm. The lens sheet 600 including the nanoscale lenses 310 may be referred to as a nanosheet or a nanofilm with thickness in a scale ranging front 1 to 100 nm.

FIGS. 3-7B illustrates exemplary embodiments of the lens sheet having partially cylindrical light refracting portions and rectangular/square, light reflecting surfaces, it is understood that the light refracting portions and the light reflecting surfaces of the tenses 310 may be in various other suitable shapes according to other embodiments, which will be illustrated below.

Figure 8A:
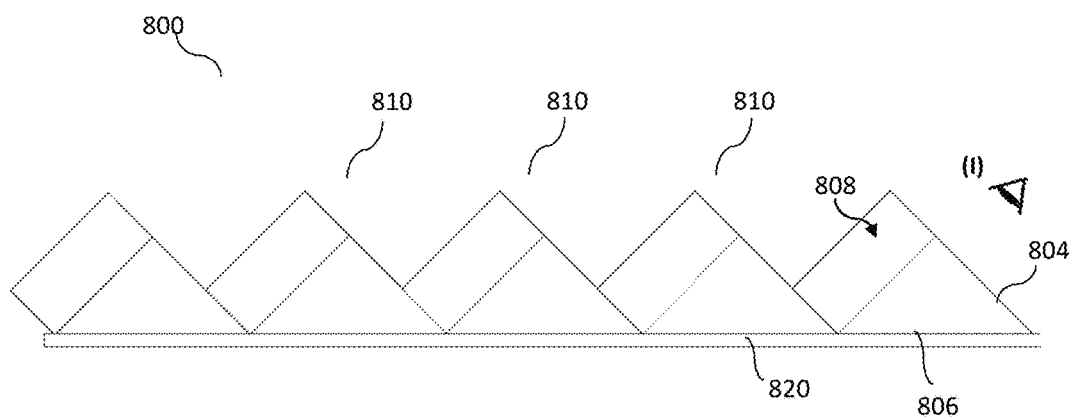
FIG. 8A shows a conceptual diagram of a lens sheet in a side view according to various embodiments.
Figure 8B:
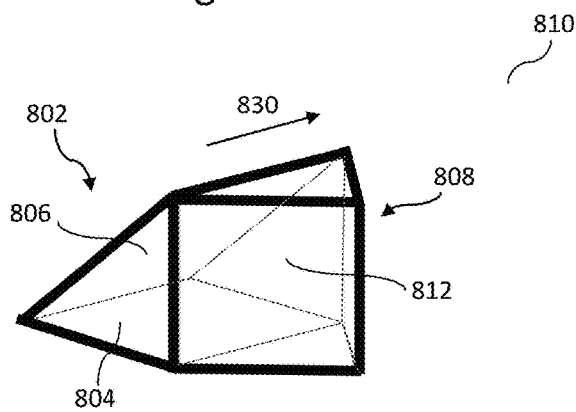
FIG. 8B shows a conceptual diagram of a single lens in a perspective view according to various embodiments.
Figure 8C:
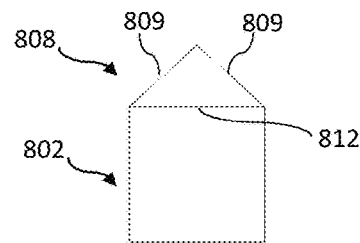
FIG. 8C shows a lens from a view angle (I) of FIG. 8A.

FIG. 8A shows a conceptual diagram of a lens sheet 800 in a side view according to various embodiments. FIG. 8B shows a conceptual diagram of a single lens 810 in a perspective view according to various embodiments. FIG. 8C shows a lens from a view angle (I) of FIG. 8A, which may correspond to the bottom view of FIG. 8B. Various embodiments described with reference to FIGS. 3-7B above hold valid for the embodiments of FIGS. 8A-8C, and vice versa.

According to the embodiments shown in FIG. 8A, the lens sheet 800 includes an array of lenses 810 arranged parallel to each other. In a perspective view of the single lens 810 shown in FIG. 8B, each lens 810 includes a light redirecting portion 802 having a light incident surface 804 and a light reflecting surface 806, and includes a light refracting portion 808. The light reflecting surface 806 is slanted relative to the light incident surface 804 and relative to a plane 812 interfacing the light redirecting portion 802 and the light refracting portion 808, such that light of a first view image and light of a second view image transmitted through the light incident surface 804 into the lens 810 are directed to a first region and a second region of the light reflecting surface 806 respectively and are reflected to the light refracting portion 808 by the light reflecting surface 806. The first region is next to the second region. The light refracting portion 808 is configured to refract the light of the first view image to a first view region and refract the light of the second view image to a second view region spaced apart from the first view region.

The lens sheet 800 is illustrated in an orientation wherein the light reflecting surfaces 806 of the lenses 810 are oriented horizontally on a horizontal plane 820. According to the embodiments shown in FIG. 8A, the light reflecting surfaces 806 of the lenses 810 extend along a plane 820 of the lens sheet 800, and the light incident surfaces 804 and the light refracting portions 808 of the lenses 810 protrude from the plane 820 of the lens sheet.

According to various embodiments, the array of lenses 810 may be arranged next to each other, such that adjacent lenses 810 abut or adjoin each other, as shown in FIG. 8A.

In the embodiments shown in FIG. 8B, the light refracting portion 808 is a lens portion in a triangular prism shape, and the light reflecting surface 806 is in the form of a square surface or a rectangular surface. According to the embodiments illustrated in FIG. 8B, each of the light redirecting portion 802 and the light refracting portion 808 may be in the form of a triangular prism, but in different orientations.

As illustrated in the embodiments of FIG. 8C, the light refracting portion 808 may include a convex surface 809 configured to refract the light of the first view image reflected from the first region of the light reflecting surface to the first view region, and refract the light of the second view image reflected from the second region of the light reflecting surface to the second view region. In this context, the convex surface 809 may protrude in an outward direction away from the light redirecting portion 802 and away from the plane 812 interfacing the light redirecting portion 802 and the light refracting portion 808. In this embodiment, the convex surface 809 is formed by two planar surfaces adjoining each other, with an angle of 0°-180° (excluding 0° and 180°) between the two planar surfaces. According to various embodiments, the light of the first view image and the light of the second view image are reflected onto different regions of the convex surface of the light refracting portion 808, for example, as illustrated in FIG. 4 above.

According to other embodiments, instead of using the convex surface 809, the light refracting portion 808 may be configured with a variation of refractive index across the light refracting portion 808, so as to refract the light reflected onto different regions of the light refracting portion 808 to different view regions. According to further embodiments, the light refracting portion 808 may be configured with both a variation of refractive index and a surface shape (e.g. convex shape), such that light reflected onto different regions of the light refracting portion 808 can be refracted to different view regions.

Although not illustrated in FIG. 8B, the first region is next to the second region of the light reflecting surface 806, similar to the embodiments shown in FIG. 3 above. The first region and the second region may be located side by side or adjacent to each other, with or without space therebetween. In an embodiment, the first region is next to the second region laterally, for example, along a horizontal direction 830. The second view region is spaced apart from the first view region, which may refer to that the first view region and the second view region are arranged with space therebetween. According to various embodiments, the first view region and the second view region are spaced apart along the same direction, along which the first region and the second region of the light reflecting surface 806 are arranged. For example, the first view region and the second view region are spaced apart laterally, for example, along the horizontal direction 830 similar to the embodiments shown in FIG. 3.

In this context, the array of lenses 810 arranged parallel to each other may refer to that the respective light redirecting portions 802 of the lenses 810 are parallel to each other, and the respective light refracting portions 808 of the lenses 810 are parallel to each other. The term "parallel" shall be understood to include substantially parallel, which may have a margin or slight departure (e.g. less than 1°, e.g., about 0.5°) from a perfect parallel arrangement.

According to various embodiments, through the light refracting portion 808, a line of sight of one eye of a viewer positioned at the first view region is focused onto the first region of the light reflecting surface, and a line of sight of the other eye of the viewer positioned at the second view region is focused onto the second region of the light reflecting surface.

According to various embodiments, the light refracting portion 808 is configured such that the light of the first view image reflected from the first region of the light reflecting surface is refracted to the first view region, and the light of the second view image reflected from the second region of the light reflecting surface is refracted to the second view region. In other words, one eye of a viewer positioned at the first view region can see the light of the first view image. Similarly, the other eye of the viewer positioned at the second view region can see the light of the second view image. Thus, each eye of the viewer views a different image or a different set of images. In this manner, when different view images are provided as a left eye image and a right eye image of a stereo pair, depth perception is created and 3D (three-dimensional) illusion is achieved through the lens sheet 800.

According to various embodiments, the lens 810 may be a microlens having a dimension between 10 μm and 100 μm. The array of lenses may also be referred to as a microlens array or a lenslet array. In other embodiments, the lens 810 may have dimensions in the nanoscale ranging from 1 to 100 nm. The lens sheet 800 including the nanoscale lenses 810 may be referred to as a nanosheet or a nanofilm with thickness in a scale ranging from 1 to 100 nm.

The lenses 810 included in the lens sheet 800 may be arranged in a one-dimensional array along either a row direction or a column direction similar to the arrangement of FIG. 3 and FIG. 5 above, or may be arranged in a two-dimensional array similar to the arrangement of FIGS. 6A-7B above.

Figure 9A:
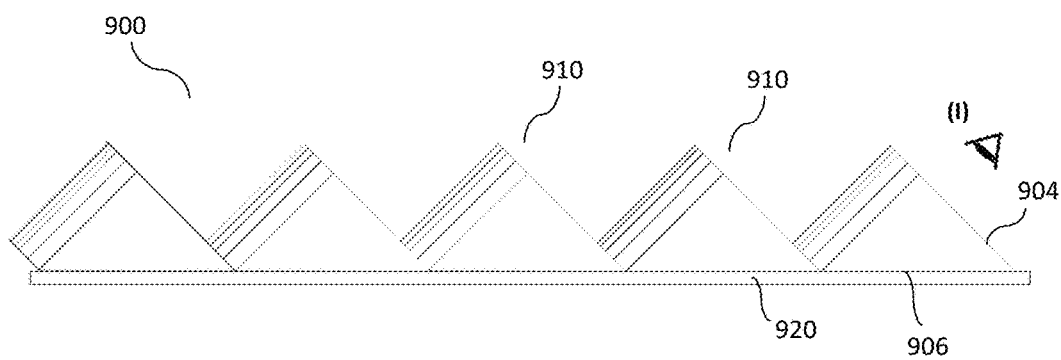
FIG. 9A shows a conceptual diagram of a lens sheet in a side view according to various embodiments.
Figure 9B:
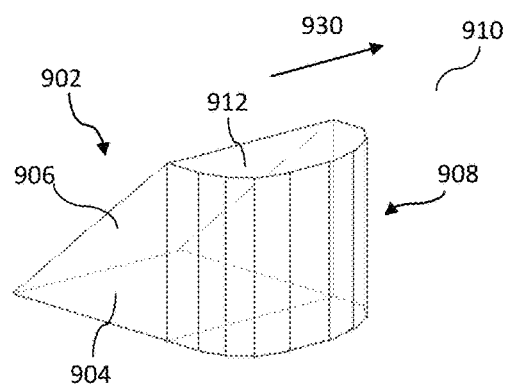
FIG. 9B shows a conceptual diagram of a single lens in a perspective view according to various embodiments.
Figure 9C:
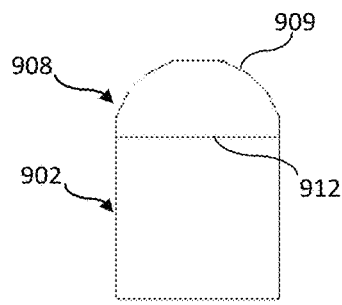
FIG. 9C shows a lens from a view angle (I) of FIG. 9A.

FIG. 9A shows a conceptual diagram of a lens sheet 900 in a side view according to various embodiments. FIG. 9B shows a conceptual diagram of a single lens 910 in a perspective view according to various embodiments. FIG. 9C shows a lens from a view angle (I) of FIG. 9A, which may correspond to the bottom view of FIG. 9B. Various embodiments described with reference to FIGS. 3-7B above hold valid for the embodiments of FIGS. 9A-9C, and vice versa.

According to the embodiments shown in FIG. 9A, the lens sheet 900 includes an array of lenses 910 arranged parallel to each other. In a perspective view of the single lens 910 shown in FIG. 9B, each lens 910 includes a light redirecting portion 902 having a light incident surface 904 and a light reflecting surface 906, and includes a light refracting portion 908. The light reflecting surface 906 is slanted relative to the light incident surface 904 and relative to a plane 912 interfacing the light redirecting portion 902 and the light refracting portion 908, such that light of a first view image and light of a second view image transmitted through the light incident surface 904 into the lens 910 are directed to a first region and a second region of the light reflecting surface 906 respectively and are reflected to the light refracting portion 908 by the light reflecting surface 906. The first region is next to the second region. The light refracting portion 908 is configured to refract the light of the first view image to a first view region and refract the light of the second view image to a second view region spaced apart from the first view region.

The lens sheet 900 is illustrated in an orientation wherein the light reflecting surfaces 906 of the lenses 910 are oriented horizontally on a horizontal plane 920. According to the embodiments shown in FIG. 9A, the light reflecting surfaces 906 of the lenses 910 extend along a plane 920 of the lens sheet 900, and the light incident surfaces 904 and the light refracting portions 908 of the lenses 910 protrude from the plane 920 of the lens sheet.

According to various embodiments, the array of lenses 910 may be arranged next to each other, such that adjacent lenses 910 abut or adjoin each other, as shown in FIG. 9A.

In the embodiments shown in FIG. 9B, the light refracting portion 908 is a lens portion in a partially polygonal prism shape, and the light reflecting surface 906 in the form of a square surface or a rectangular surface. According to the embodiments illustrated in FIG. 9B, the light redirecting portion 902 may be in the form of a triangular prism, and the light refracting portion 908 may be in the form of a partially polygonal prism, with different orientations and adjoining each other. It is understood that the light redirecting portion 902 and the light refracting portion 908 may be integrally formed, or may be separately formed and adjoined together.

As illustrated in the embodiments of FIG. 9C, the light refracting portion 908 may include a convex surface 909 configured to refract the light of the first view image reflected from the first region of the light reflecting surface to the first view region, and refract the light of the second view image reflected from the second region of the light reflecting surface to the second view region. In this context, the convex surface 909 may protrude in an outward direction away from the light redirecting portion 902 and away from the plane 912 interfacing the light redirecting portion 902 and the light refracting portion 908. In this embodiment, the convex surface 909 is formed by a plurality of planar surfaces adjoining each other, with an angle of 0°-180° (excluding 0° and 180°) between adjacent planar surfaces. According to various embodiments, the light of the first view image and the light of the second view image are reflected onto different regions of the convex surface of the light refracting portion 908, e.g. as illustrated in FIG. 4 above.

According to other embodiments, instead of using the convex surface 909, the light refracting portion 908 may be configured with a variation of refractive index across the light refracting portion 908, so as to refract the light reflected onto different regions of the light refracting portion 908 to different view regions. According to further embodiments, the light refracting portion 908 may be configured with both a variation of refractive index and a surface shape (e.g. convex shape), such that light reflected onto different regions of the light refracting portion 908 can be refracted to different view regions.

Although not illustrated in FIG. 9B, the first region is next to the second region of the light reflecting surface 906, similar to the embodiments shown in FIG. 3 above. The first region and the second region may be located side by side or adjacent to each other, with or without space therebetween. In an embodiment, the first region is next to the second region laterally, for example, along a horizontal direction 930. The second view region is spaced apart from the first view region, which may refer to that the first view region and the second view region are arranged with space therebetween. According to various embodiments, the first view region and the second view region are spaced apart along the same direction, along which the first region and the second region of the light reflecting surface 906 are arranged. For example, the first view region and the second view region are spaced apart laterally, for example, along the horizontal direction 930 similar to the embodiments shown in FIG. 3.

In this context, the array of lenses 910 arranged parallel to each other may refer to that the respective light redirecting portions 902 of the lenses 910 are parallel to each other, and the respective light refracting portions 908 of the lenses 910 are parallel to each other. The term "parallel" shall be understood to include substantially parallel, which may have a margin or slight departure (e.g. less than 1°, e.g., about 0.5°) from a perfect parallel arrangement.

According to various embodiments, through the light refracting portion 908, a line of sight of one eye of a viewer positioned at the first view region is focused onto the first region of the light reflecting surface, and a line of sight of the other eye of the viewer positioned at the second view region is focused onto the second region of the light reflecting surface.

According to various embodiments, the light refracting portion 908 is configured such that the light of the first view image reflected from the first region of the light reflecting surface is refracted to the first view region, and the light of the second view image reflected from the second region of the light reflecting surface is refracted to the second view region. In other words, one eye of a viewer positioned at the first view region can see the light of the first view image. Similarly, the other eye of the viewer positioned at the second view region can see the light of the second view image. Thus, each eye of the viewer views a different image or a different set of images. In this manner, when different view images are provided as a left eye image and a right eye image of a stereo pair, depth perception is created and 3D (three-dimensional) illusion is achieved through the lens sheet 900.

According to various embodiments, the lens 910 may be a microlens having dimensions between 10 μm and 1000 μm, or may be a nanolens have dimensions in the nanoscale ranging from 1 to 100 nm.

The lenses 910 included in the lens sheet 900 may be arranged in a one-dimensional array along either a row direction or a column direction similar to the arrangement of FIG. 3 and FIG. 5 above, or may be arranged in a two-dimensional array similar to the arrangement of FIGS. 6A-7B above.

Figure 10A:
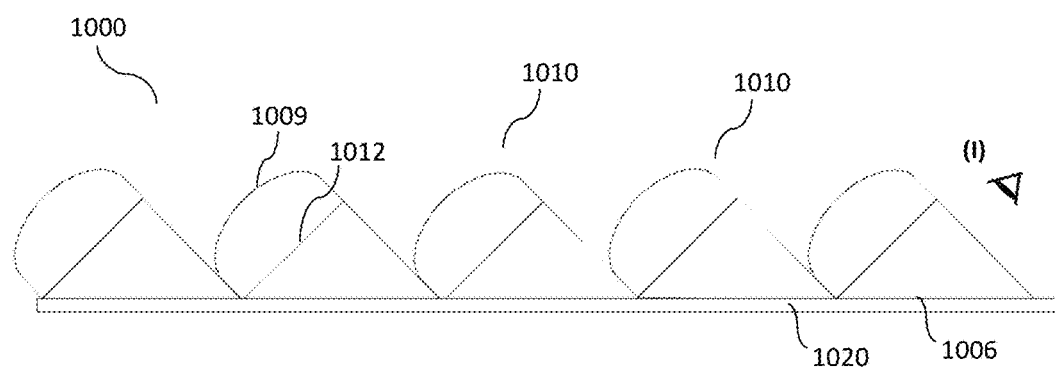
FIG. 10A shows a conceptual diagram of a lens sheet in a side view according to various embodiments.
Figure 10B:
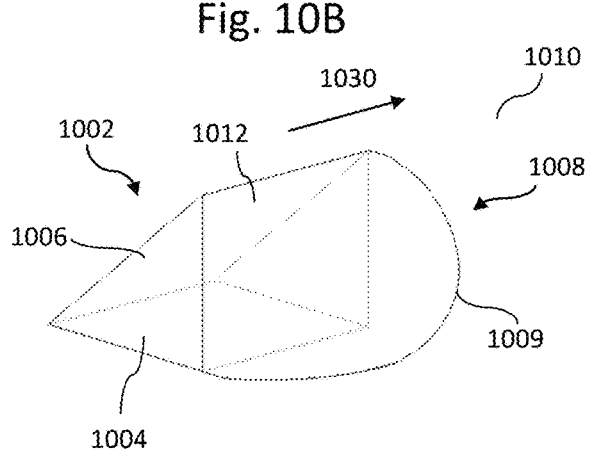
FIG. 10B shows a conceptual diagram of a single lens in a perspective view according to various embodiments.
Figure 10C:
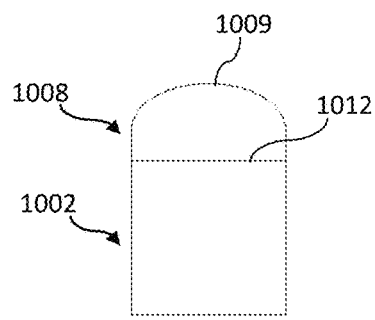
FIG. 10C shows a lens from a view angle (I) of FIG. 10A.

FIG. 10A shows a conceptual diagram of a lens sheet 1000 in a side view according to various embodiments. FIG. 10B shows a conceptual diagram of a single lens 1010 in a perspective view according to various embodiments. FIG. 10C shows a lens from a view angle (I) of FIG. 10A, which may correspond to the bottom view of FIG. 10B. Various embodiments described with reference to FIGS. 3-7B above hold valid for the embodiments of FIGS. 10A-10C, and vice versa.

According to the embodiments shown in FIG. 10A, the lens sheet 1000 includes an array of lenses 1010 arranged parallel to each other. In a perspective view of the single lens 1010 shown in FIG. 10B, each lens 1010 includes a light redirecting portion 1002 having a light incident surface 1004 and a light reflecting surface 1006, and includes a light refracting portion 1008. The light reflecting surface 1006 is slanted relative to the light incident surface 1004 and relative to a plane 1012 interfacing the light redirecting portion 1002 and the light refracting portion 1008, such that light of a first view image and light of a second view image transmitted through the light incident surface 1004 into the lens 1010 are directed to a first region and a second region of the light reflecting surface 1006 respectively and are reflected to the light refracting portion 1008 by the light reflecting surface 1006. The first region is next to the second region. The light refracting portion 1008 is configured to refract the light of the first view image to a first view region and refract the light of the second view image to a second view region spaced apart from the first view region.

The lens sheet 1000 is illustrated in an orientation wherein the light reflecting surfaces 1006 of the lenses 1010 are oriented horizontally on a horizontal plane 1020. According to the embodiments shown in FIG. 10A, the light reflecting surfaces 1006 of the lenses 1010 extend along a plane 1020 of the lens sheet 1000, and the light incident surfaces 1004 and the light refracting portions 1008 of the lenses 1010 protrude from the plane 1020 of the lens sheet.

According to various embodiments, the array of lenses 1010 may be arranged next to each other, such that adjacent lenses 1010 abut or adjoin each other, as shown in FIG. 10A.

In the embodiments shown in FIG. 10B, the light refracting portion 1008 is a lens portion close to a partially spherical shape, with a planar rectangular or square surface 1012. The planar rectangular or square surface 1012 is the surface interfacing with the light redirecting portion 1002. The light refracting portion 1008 further includes a convex surface 1009 both viewed from the side of FIG. 10B as shown in FIG. 10A, and viewed from the bottom of FIG. 10B as shown in FIG. 10C. The convex surface 1009 is configured to refract the light of the first view image reflected from the first region of the light reflecting surface to the first view region, and refract the light of the second view image reflected from the second region of the light reflecting surface to the second view region. In this embodiment, the convex surface 1009 is a curved surface, with a cross-sectional view in the form of a circular segment. In this context, the convex surface 1009 may protrude in an outward direction away from the light redirecting portion 1002 and away from the plane 1012 interfacing the light redirecting portion 1002 and the light refracting portion 1008. According to various embodiments, the light of the first view image and the light of the second view image are reflected onto different regions of the convex surface of the light refracting portion 1008, e.g. as illustrated in FIG. 4 above.

The light reflecting surface 1006 is in the form of a square surface or a rectangular surface. According to the embodiments illustrated in FIG. 10B, the light redirecting portion 1002 may be in the form of a triangular prism, adjoining the light refracting portion 1008 at the planar surface 1012. The illustration of the planar surface 1012 is for the purpose of illustrating the shape of the respective portions of the lens 1010, it is understood that the light redirecting portion 1002 and the light refracting portion 1008 may be integrally formed without the planar surface 1012 formed therebetween, or may be separately formed and adjoined together.

According to other embodiments, instead of using the convex surface 1009, the light refracting portion 1008 may be configured with a variation of refractive index across the light refracting portion 1008, so as to refract the light reflected onto different regions of the light refracting portion 1008 to different view regions. According to further embodiments, the light refracting portion 1008 may be configured with both a variation of refractive index and a surface shape (e.g. convex shape), such that light reflected onto different regions of the light refracting portion 1008 can be refracted to different view regions.

Although not illustrated in FIG. 10B, the first region is next to the second region of the light reflecting surface 1006, similar to the embodiments shown in FIG. 3 above. The first region and the second region may be located side by side or adjacent to each other, with or without space therebetween. In an embodiment, the first region is next to the second region laterally, for example, along a horizontal direction 1030. The second view region is spaced apart from the first view region, which may refer to that the first view region and the second view region are arranged with space therebetween. According to various embodiments, the first view region and the second view region are spaced apart along the same direction, along which the first region and the second region of the light reflecting surface 1006 are arranged. For example, the first view region and the second view region are spaced apart laterally, for example, along the horizontal direction 1030 similar to the embodiments shown in FIG. 3.

In this context, the array of lenses 1010 arranged parallel to each other may refer to that the respective light redirecting portions 1002 of the lenses 1010 are parallel to each other, and the respective light refracting portions 1008 of the lenses 1010 are parallel to each other. The term "parallel" shall be understood to include substantially parallel, which may have a margin or slight departure (e.g. less than 1°, about 0.5°) from a perfect parallel arrangement.

According to various embodiments, through the light refracting portion 1008, a line of sight of one eye of a viewer positioned at the first view region is focused onto the first region of the light reflecting surface, and a line of sight of the other eye of the viewer positioned at the second view region is focused onto the second region of the light reflecting surface.

According to various embodiments, the light refracting portion 1008 is configured such that the light of the first view image reflected from the first region of the light reflecting surface is refracted to the first view region, and the light of the second view image reflected from the second region of the light reflecting surface is refracted to the second view region. In other words, one eye of a viewer positioned at the first view region can see the light of the first view image. Similarly, the other eye of the viewer positioned at the second view region can see the light of the second view image. Thus, each eye of the viewer views a different image or a different set of images. In this manner, when different view images are provided as a left eye image and a right eye image of a stereo pair, depth perception is created and 3D (three-dimensional) illusion is achieved through the lens sheet 1000.

According to various embodiments, the lens 1010 may be a microlens having dimensions between 10 μm and 1000 μm, or may be a nanolens have dimensions in the nanoscale ranging from 1 to 100 nm.

The lenses 1010 included in the lens sheet 1000 may be arranged in a one-dimensional array along either a row direction or a column direction similar to the arrangement of FIG. 3 and FIG. 5 above, or may be arranged in a two-dimensional array similar to the arrangement of FIGS. 6A-7B above.

FIG. 11A shows a conceptual diagram of a lens sheet 1100 in a perspective view according to various embodiments. FIG. 11B shows a conceptual diagram of a single lens 1110 in a perspective view according to various embodiments.

Various embodiments described with reference to FIGS. 3-7B above hold valid for the embodiments of FIGS. 11A and 11B, and vice versa.

According to the embodiments shown in FIG. 11A, the lens sheet 1100 includes an array of lenses 1110 arranged parallel to each other. In a perspective view of the single lens 1110 shown in FIG. 11B, each lens 1110 includes a light redirecting portion 1102 having a light incident surface 1104 and a light reflecting surface 1106, and includes a light refracting portion 1108. The light reflecting surface 1106 is slanted relative to the light incident surface 1104 and relative to a plane 1112 interfacing the light redirecting portion 1102 and the light refracting portion 1108, such that light of a first view image and light of a second view image transmitted through the light incident surface 1104 into the lens 1110 are directed to a first region and a second region of the light reflecting surface 1106 respectively and are reflected to the light refracting portion 1108 by the light reflecting surface 1106. The first region is next to the second region. The light refracting portion 1108 is configured to refract the light of the first view image to a first view region and refract the light of the second view image to a second view region spaced apart from the first view region.

The lens sheet 1100 is illustrated in an orientation wherein the light reflecting surfaces 1106 of the lenses 1110 are oriented horizontally on a horizontal plane 1120. According to the embodiments shown in FIG. 11A, the light reflecting surfaces 1106 of the lenses 1110 extend along a plane 1120 of the lens sheet 1100, and the light incident surfaces 1104 and the light refracting portions 1108 of the lenses 1110 protrude from the plane 1120 of the lens sheet 1100.

Figure 14A:
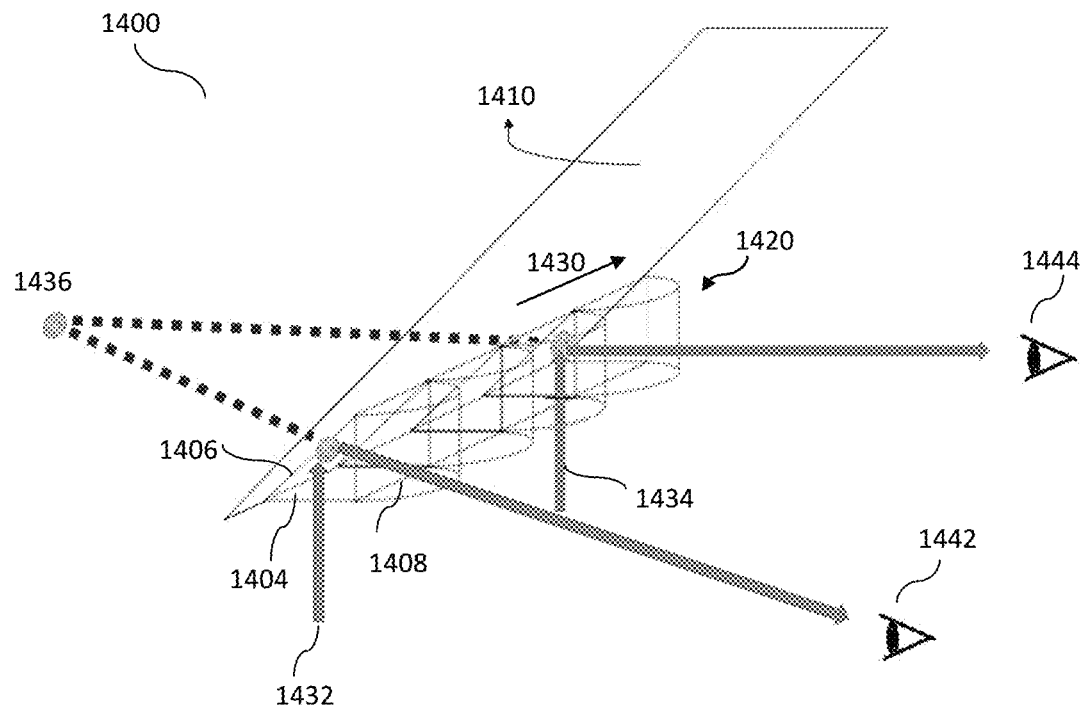
FIG. 14A shows a conceptual diagram of an augmented reality device according to various embodiments.

In the embodiments of FIG. 11A, the array of lenses 1110 may be arranged with space 1122 between each other, as shown in FIG. 11A. The space 1122 between the lenses 1110 may allow light coming from the other side of the plane 1120, for example, from the bottom side of the plane 1120 shown in FIG. 11A, to pass through the lens film 1100 without entering the lenses 1110, thereby reducing distortion of light coming behind the film 1110. For example, when the array of lenses 1110 are arranged on a windscreen as shown in FIGS. 14A-15 below, light coming from the outside of the windscreen can pass through the space between lenses for viewing by the driver.

In the embodiments shown in FIG. 11B, the light refracting portion 1108 is a lens portion in a partially spherical shape, with a planar circular surface 1112. The planar circular surface 1112 is the surface interfacing the light redirecting portion 1102. The light refracting portion 1108 further includes a convex surface 1109 configured to refract the light of the first view image reflected from the first region of the light reflecting surface to the first view region, and refract the light of the second view image reflected from the second region of the light reflecting surface to the second view region. In this context, the convex surface 1109 may protrude in an outward direction away from the light redirecting portion 1102 and away from the plane 1112 interfacing the light redirecting portion 1102 and the light refracting portion 1108. In this embodiment, the convex surface 1109 is a curved spherical surface. According to various embodiments, the light of the first view image and the light of the second view image are reflected onto different regions of the convex surface 1112 of the light refracting portion 1108, e.g. as illustrated in FIG. 4 above.

In the embodiments of FIGS. 11A and 11B, the light reflecting surface 1106 is in the form of a circular surface. The light redirecting portion 1102 may be in the form of an oblique cylinder, adjoining the light refracting portion 1108 at the planar circular surface 1112. The illustration of the planar surface 1112 is for the purpose of illustrating the shape of the respective portions of the lens 1110, it is understood that the light redirecting portion 1102 and the light refracting portion 1108 may be integrally formed without the planar surface 1112 formed therebetween, or may be separately formed and adjoined together.

According to other embodiments, instead of using the convex surface 1109, the light refracting portion 1108 may be configured with a variation of refractive index across the light refracting portion 1108, so as to refract the light reflected onto different regions of the light refracting portion 1108 to different view regions. According to further embodiments, the light refracting portion 1108 may be configured with both a variation of refractive index and a surface shape (e.g. convex shape), such that light reflected onto different regions of the light refracting portion 1108 can be refracted to different view regions.

Although not illustrated in FIG. 11B, the first region is next to the second region of the light reflecting surface 1106, similar to the embodiments shown in FIG. 3 above. The first region and the second region may be located side by side or adjacent to each other, with or without space therebetween. In an embodiment, the first region is next to the second region laterally. The second view region is spaced apart from the first view region, which may refer to that the first view region and the second view region are arranged with space therebetween. According to various embodiments, the first view region and the second view region are spaced apart along the same direction, along which the first region and the second region of the light reflecting surface 1106 are arranged. For example, the first view region and the second view region are spaced apart laterally, for example, along the horizontal direction similar to the embodiments shown in FIG. 3.

In this context, the array of lenses 1110 arranged parallel to each other may refer to that the respective light redirecting portions 1102 of the lenses 1110 are parallel to each other, and the respective light refracting portions 1108 of the lenses 1110 are parallel to each other. The term "parallel" shall be understood to include substantially parallel, which may have a margin or slight departure (e.g. less than 1°, e.g., about 0.5°) from a perfect parallel arrangement.

According to various embodiments, through the light refracting portion 1108, a line of sight of one eye of a viewer positioned at the first view region is focused onto the first region of the light reflecting surface, and a line of sight of the other eye of the viewer positioned at the second view region is focused onto the second region of the light reflecting surface.

According to various embodiments, the light refracting portion 1108 is configured such that the light of the first view image reflected from the first region of the light reflecting surface is refracted to the first view region, and the light of the second view image reflected from the second region of the light reflecting surface is refracted to the second view region. In other words, one eye of a viewer positioned at the first view region can see the light of the first view image. Similarly, the other eye of the viewer positioned at the second view region can see the light of the second view image. Thus, each eye of the viewer views a different image or a different set of images. In this manner, when different view images are provided as a left eye image and a right eye image of a stereo pair, depth perception is created and 3D (three-dimensional) illusion is achieved through the lens sheet 1100.

According to various embodiments, the lens 1110 may be a microlens having dimensions between 10 μm and 1000 μm, or may be a nanolens have dimensions in the nanoscale ranging from 1 to 100 nm.

The lenses 1110 included in the lens sheet 1100 may be arranged in a two-dimensional array as shown in FIGS. 11A and 11B, or may be arranged in a one-dimensional array along either a row direction or a column direction similar to the arrangement of FIG. 3 and FIG. 5 above.

Figure 12:
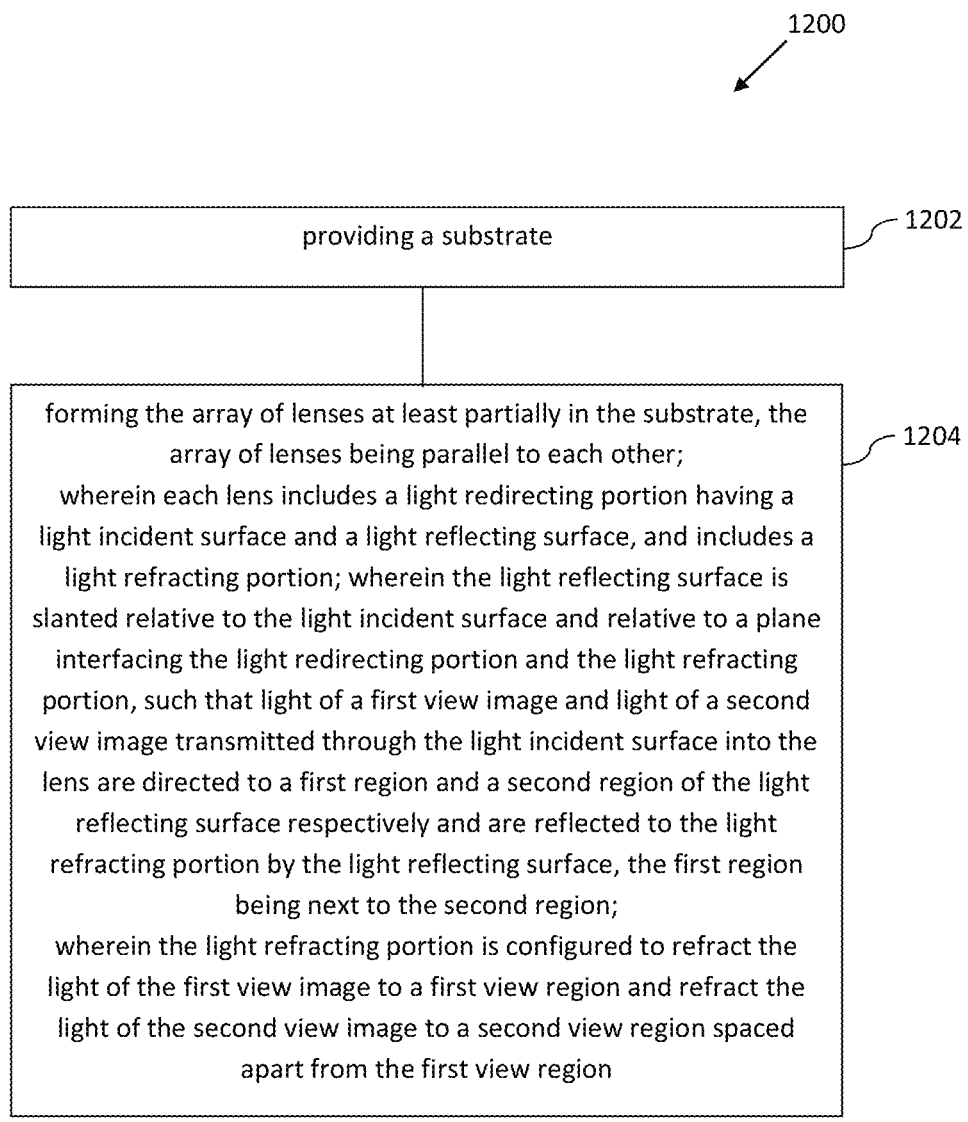
FIG. 12 shows a flowchart illustrating a method of forming a lens sheet including an array of lenses according to various embodiments.

FIG. 12 shows a flowchart 1200 illustrating a method of forming a lens sheet including an array of lenses according to various embodiments. The method may be used to form any of the lens sheet 300, 500, 600, 800, 900, 1000, 1100 described in various embodiments of FIGS. 3-11B above. Various embodiments of the lens sheet described in various embodiments of FIGS. 3-11B above hold true for the method described herein, and vice versa.

At 1202, a substrate is provided. According to various embodiments, the substrate may be a polycarbonate (PC) substrate or a polyethylene terephthalate (PET) substrate.

As 1204, the array of lenses are formed at least partially in the substrate, wherein the array of lenses are parallel to each other. Each lens includes a light redirecting portion including a light incident surface and a light reflecting surface, and includes a light refracting portion. The light reflecting surface is slanted relative to the light incident surface and relative to a plane interfacing the light redirecting portion and the light refracting portion, such that light of a first view image and light of a second view image transmitted through the light incident surface into the lens are directed to a first region and a second region of the light reflecting surface respectively and are reflected to the light refracting portion by the light reflecting surface, the first region being next to the second region. The light refracting portion is configured to refract the light of the first view image to a first view region and refract the light of the second view image to a second view region spaced apart from the first view region.

According to various embodiments, the method 1200 may further include providing a mold having a profiled surface complementary to the light redirecting portions of the lenses, and pressing the mold and the substrate together by thermal nanoimprinting or ultra-violet nanoimprinting, thereby molding a portion of the substrate to form the light redirecting portions of the lenses.

According to various embodiments, the method 1200 may further include forming the light refracting portion of each lens on top of the respective light redirecting portion by additive manufacturing or roll-to-roll printing.

According to various embodiments, the method 1200 may further include fabricating the mold having the profiled surface complementary to the light redirecting portions of the lenses.

According to various embodiments, the method 1200 may further include providing a mold having a profiled surface complementary to the contour of the lenses, including the contour of the light redirecting portions and the light refracting portions of the lenses. The method 1200 may include pressing the mold and the substrate together by thermal nanoimprinting or ultra-violet nanoimprinting, thereby molding a portion of the substrate to form the lenses, such that the light redirecting portions and the light refracting portions of the lenses are integrally formed.

Figure 13A:
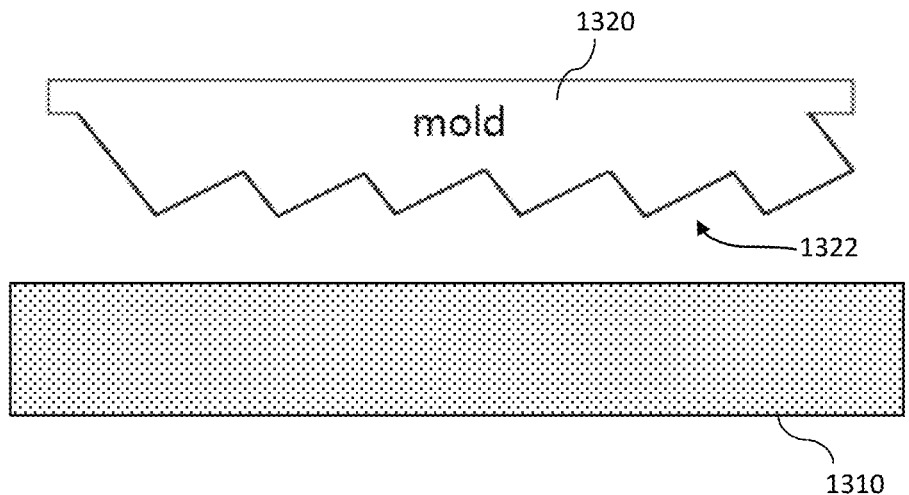
FIGS. 13A and 13B show a conceptual diagram illustrating a process of forming the light redirecting portions of the lenses according to various embodiments.
Figure 13B:
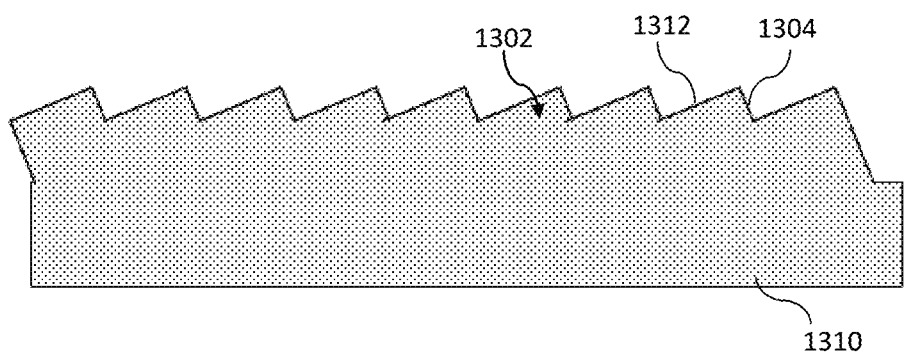

FIGS. 13A and 13B show a conceptual diagram illustrating the process of forming the light redirecting portions of the lenses.

As shown in FIG. 13A, a substrate 1310 is provided. According to various embodiments, the substrate may be a polycarbonate (PC) substrate or a polyethylene terephthalate (PET) substrate.

A mold 1320 having a profiled surface 1322 complementary to the light redirecting portions of the lenses is provided. For example, the profiled surface 1322 is complementary to the circumferential surface of the light redirecting portions of the lenses illustrated above.

FIG. 13B shows a cross-sectional view of the substrate 1310 after the light redirecting portions 1302 of the lenses are formed in the substrate 1310. The light redirecting portions 1302 of the lenses are formed by pressing the mold 1320 and the substrate 1310 together via thermal nanoimprinting or ultra-violet nanoimprinting, thereby molding a portion of the substrate 1310 to form the light redirecting portions 1302 of the lenses. The light redirecting portion 1302 of each lens include a light incident surface 1304, for example, similar to the light incident surface 304 as shown in FIG. 7A above. The light redirecting portion 1302 of each lens further includes a surface 1312, for example, similar to the surface 312 illustrated in FIG. 7A above. The surface 1312 is the surface of the light redirecting portion 1302 adjoining the light refracting portion (not shown) formed onto the surface 1312. For example, an array of semi-cylindrical lenslets may be formed as the light refracting portions on the array of surfaces 1312. The light refracting portion of each lens may be formed on top of the respective light redirecting portion by additive manufacturing or roll-to-roll printing, wherein the light refracting portion may be in various shapes, for example, as illustrated in FIGS. 3-11B above. The finally formed substrate with the array of lenses at least partially formed in the substrate may be the lens sheet described above.

Although FIGS. 13A and 13B illustrates an exemplary embodiment that the light redirecting portion and the light refracting portion are separately formed and adjoined together, it is understood that the light redirecting portion and the light refracting portion may be integrally formed on the substrate 1310 in other embodiments. For example, the light redirecting portion and the light refracting portion may be integrally formed on the substrate 1310 by providing a mold having a profiled surface complementary to the contour of the lenses (including the contour of the light redirecting portions and the light refracting portions of the lenses), and pressing the mold and the substrate 1310 together by thermal nanoimprinting or ultra-violet nanoimprinting, thereby molding a portion of the substrate to form the lenses.

The lens sheet and the lens array described in various embodiments above may be applied in augmented reality devices to provide 3D presentation of augmented images to viewers.

FIG. 14A shows a conceptual diagram of an augmented reality device 1400 according to various embodiments.

The augmented reality device 1400 includes a display screen 1410, and an array of lenses 1420 parallel to each other and arranged on a surface of the display screen 1410. Each lens includes a light redirecting portion having a light incident surface 1404 and a light reflecting surface 1406, and includes a light refracting portion 1408. The light reflecting surface 1406 is slanted relative to the light incident surface 1404 and relative to a plane interfacing the light redirecting portion and the light refracting portion 1408, such that light 1432 of a first view image and light 1434 of a second view image transmitted through the light incident surface 1404 into the lens are directed to a first region and a second region of the light reflecting surface 1406 respectively and are reflected to the light refracting portion 1408 by the light reflecting surface 1406. The first region is next to the second region in the light reflecting surface 1406 of each lens. The light refracting portion 1408 is configured to refract the light 1432 of the first view image to a first view region 1442 and refract the light 1434 of the second view image to a second view region 1444 spaced apart from the first view region 1442.

In FIG. 14A, the light 1432 of the first view image and the light 1434 of the second view image are shown to be projected to different lenses, for illustrative purposes only. It is understood that each lens (e.g. selected lens for receiving light of corresponding images) may receive both the light 1432 of the first view image and the light 1434 of the second view image, wherein the first view image and the second view image for each lens may be a respective sub-image of a left eye image and a respective sub-image of a right eye image, as illustrated in FIG. 4 above. It is understood that the light paths of the lights 1432, 1434 shown in FIG. 14A are for illustrative purposes only, and may not represent the actual light paths of the lights 1432, 1434.

According to various embodiments, a stereo pair including a left eye image and a right eye image may be provided. Each of the left eye image and the right eye image may be sliced into a plurality of sub-images, for example, a plurality of strips. In various embodiments, each sub-image may include at least one pixel. In various embodiments, each sub-image may include at least a column of pixels. The plurality of sub-images of the left eye image may be the first view images directed onto the first regions of the plurality of lenses, respectively, as illustrated in FIG. 4 above. Similarly, the plurality of sub-images of the right eye image may be the second view images directed onto the second regions of the plurality of lenses, respectively. The plurality of sub-images of the left eye image and the plurality of sub-images of the right eye image directed onto the plurality of lenses are thus interleaved to form a lenticular image, which when redirected through the respective light reflecting surfaces 1406 and refracted through the respective light refracting portions 1408 of the lenses, are respectively seen by the left eye and the right eye of the viewer respectively positioned at the first view region 1442 and the second view region 1444. In other words, the first view region 1442 is the left eye view region of the driver, and the second view region 1444 is the right eye view region of the driver. Thus, the left eye sees the whole left eye image, and the right eye sees the whole right eye image, thus achieving depth perception and 3D illusion at the viewer's side.

According to various embodiments, the augmented reality device 1400 utilizes the array of lenses 1420 to redirect lights (e.g. provided from a projector of a head-up display) at a certain angle towards different viewing regions 1442, 1444, thereby creating a 3D illusion which provides accurate placement of augmented image on each eyes of the viewer. As shown in FIG. 14A, the left eye image is seen by a left eye at the first viewing region 1442, and the right eye image is seen by a right eye at the second viewing region 1444, such that an image 1436 perceived by the brain of the viewer is further away from the display screen 1410, and is superimposed on the object of view where the viewer focuses. Accordingly, the distortion caused by the difference in eye focus and image angle can be eliminated by the augmented reality device of FIG. 14A.

According to various embodiments, the light refracting portion 1408 may be configured, for example, by configuring the curvature or protruding angle of a convex surface of the light refracting portion 1408, to adjust the viewing angle of the light refracting portion 1408, so that the distance between the first viewing region 1442 and the second view region 1444 is substantially the same (e.g. with a difference margin of less than 10%) as the distance between the left eye and the right eye of the viewer.

The array of lenses 1420 shown in FIG. 14A may be the lens array shown in FIG. 3 above. Various embodiments of the lenses described with reference to FIG. 3 above analogously hold valid for the embodiments of FIG. 14A. Although the array of lenses 1420 is shown in FIG. 14A as a one-dimensional array along a row direction with the light incident surfaces 1404 of the lenses arranged on the same plane, it is understood that the array of lenses 1420 may be arranged in a one-dimensional array along a column direction similar to the embodiments of FIG. 5 above, or may be in a two-dimensional array in rows and columns similar to the embodiments of FIGS. 6A-7B above, in various embodiments. Although the shape and configuration of the lenses shown in FIG. 14A is similar to the embodiments of FIG. 3 above, the shape and configuration of the lenses arranged on the display screen 1410 may be according to any other suitable embodiments above, for example, as in the embodiments of FIGS. 8A-11B above.

The first region is next to the second region in each light reflecting surface 1406, which may refer to that the first region and the second region are located side by side or adjacent to each other, with or without space therebetween. The first region may be next to the second region laterally, for example, along a horizontal direction 1430. The second view region 1444 is spaced apart from the first view region 1442, which may refer to that the first view region 1442 and the second view region 1444 are arranged with space therebetween. According to various embodiments, the first view region 1442 and the second view region 1444 are spaced apart along the same direction, along which the first region and the second region are arranged. For example, the first view region 1442 and the second view region 1444 are spaced apart laterally, e.g., along the horizontal direction 1430 as shown in FIG. 14A.

In this context, the array of lenses 1420 arranged parallel to each other may refer to that the respective light incident surfaces 1404 of the lenses are parallel to each other, and the respective light reflecting surfaces 1406 of the lenses are parallel to each other. Further, the respective light refracting portions 1408 of the lenses are parallel to each other. In this context, the term "parallel" shall be understood to include substantially parallel, which may have a margin or slight departure (e.g. less than 1°, e.g., about 0.5°) from a perfect parallel arrangement.

According to various embodiments, through the light refracting portion 1408, a line of sight of one eye of a viewer positioned at the first view region 1442 is focused onto the first region of the light reflecting surface, and a line of sight of the other eye of the viewer positioned at the second view region 1444 is focused onto the second region of the light reflecting surface.

According to various embodiments, the light refracting portion 1408 is configured such that the light 1432 of the first view image reflected from the first region of the light reflecting surface is refracted to the first view region 1442, and the light 1434 of the second view image reflected from the second region of the light reflecting surface is refracted to the second view region 1444. In other words, one eye of a viewer positioned at the first view region can see the light of the first view image. Similarly, the other eye of the viewer positioned at the second view region can see the light of the second view image. Thus, each eye of the viewer views a different image or a different set of images. In this manner, when different view images are provided as a left eye image and a right eye image of a stereo pair, depth perception is created and 3D (three-dimensional) illusion is achieved through the array of lenses 1420.

According to various embodiments, the light refracting portion 1408 may include a convex surface configured to refract the light 1432 of the first view image reflected from the first region of the light reflecting surface 1406 to the first view region 1442, and refract the light 1434 of the second view image reflected from the second region of the light reflecting surface 1406 to the second view region 1444. According to various embodiments, the light 1432 of the first view image and the light 1434 of the second view image are reflected onto different regions of the convex surface of the light refracting portion 1408.

According to various embodiments, the convex surface may be a curved surface, for example, a curved surface of a partial cylinder 1408 as shown in FIG. 14A. In other embodiments, the convex surface may be formed of a plurality of planar surfaces adjoining each other, with an angle of 0°-180° (excluding 0° and 180°) between the adjacent planar surfaces, for example, as described in the embodiments of FIGS. 8A-9C above.

According to other embodiments, instead of using a convex surface in the light refracting portion 1408 for refracting the light reflected onto different regions of the convex surface to different view regions 1442, 1444, the light refracting portion 1408 may be configured with a variation of refractive index across the light refracting portion 1408, so as to refract the light reflected onto different regions of the light refracting portion 1408 to different view regions 1442, 1444. According to further embodiments, the light refracting portion 1408 may be configured with both a variation of refractive index and a surface shape (e.g. convex shape), such that light reflected onto different regions of the light refracting portion 1408 can be refracted to different view regions 1442, 1444.

In an exemplary embodiment, the light incident surface 1404 is perpendicular to the light refracting portion 1408, which may include substantially perpendicular to the light refracting portion 1408 with a margin or slight departure (e.g. less than 1°, e.g., about 0.5°) from a perfect perpendicular arrangement. The incident angle of the light 1432, 1434 may be 0° or within a margin of less than 1°. The reflecting surface 1406 may be slanted relative to the light incident surface 1404 at an angle of about 45° (for example, within a margin of less than 1° around 45°). Accordingly, the reflecting surface 1406 reflects the light 1432, 1434 along a horizontal direction towards the light refracting portion 1408. It is understood that in various embodiments, the relative arrangement among the light incident surface 1404, the light reflecting surface 1406 and the light refracting portion 1408, as well as the incident angle of incident light may be configured and adjusted accordingly, such that the incident light can be redirected to the light refracting portion 1408 and refracted to different view regions.

In various embodiments, the light refracting portion 1408 may be a lens portion in at least one of a partially cylindrical shape, a partially polygonal prism shape, a triangular prism shape, or a partially spherical shape, or in various other suitable shapes, as illustrated in the embodiments of FIGS. 3-11B above. FIG. 14A illustrates an exemplary lenticular lens portion 308 in a partially cylindrical shape. In this context, the partially cylindrical shape may include a semi-cylindrical lens portion, or may include part of a right circular cylinder, or part of a right elliptic cylinder, or part of an oblique cylinder.

In various embodiments, the light reflecting surface 1406 may be at least one of a square surface, a rectangular surface, a polygonal surface, a circular surface, or an elliptic surface, or in various other suitable shapes, as illustrated in the embodiments of FIGS. 3-11B above.

According to various embodiments, the array of lenses 1420 may be arranged next to each other, such that adjacent lenses abut or adjoin each other, as shown in FIG. 14A. In other embodiments, the array of lenses 1420 may be arranged with space between each other, for example, as shown in the embodiment of FIGS. 11A and 11B above.

According to various embodiments, the lens in the array 1420 may be a microlens having dimensions between 10 μm and 1000 μm or may be a nanolens having dimensions in the nanoscale ranging from 1 nm to 100 nm. The array f lenses 1420 may be referred to as a microlens array, a lenslet array, nanolens array accordingly.

According to various embodiments, the array of lenses 1420 may be arranged on the display screen, for example, directly formed on the surface of the display screen 1410. According to various embodiments, the array of lenses 1420 may be formed as a lens sheet, for example, through nanoimprinting technology. The lens sheet is arranged on the surface of the display screen 1410. For example, the lens sheet may be attached onto the display screen 1410, thereby producing an autostereoscopic display and a 3D augmented reality device which is glasses free. The light reflecting surfaces 1406 of the lenses may extend along a plane of the lens sheet or a plane of the display screen 1410, and the light incident surfaces 1404 and the light refracting portions 1408 of the lenses protrude from the plane of the lens sheet or the plane of the display screen 1410.

According to various embodiments, the display screen 1410 may be a transparent screen. In various embodiments, the display screen 1410 may be one of a windscreen of a vehicle, a combiner of a head-up display, or a display element of a head-mounted display. Accordingly, a driver seating behind the windscreen or the combiner, or a driver wearing the head-mounted display, could see the augmented image projected onto the light incident surfaces 1404 from the head-up display or the head-mounted display, as well as the actual scene and object further away in front of the windscreen/combiner/display element. The augmented image may be perceived as superimposed on the actual scene and object, so that distortion caused by the focus of the driver can be eliminated.

According to various embodiments, the augmented reality device 1400 may be or may include a head-up display or a head-mounted display.

According to various embodiments, the augmented reality device 1400 may further include an image input (not shown) configured to project light of a respective first view image and light of a respective second view image to a respective selected lens of the array of lenses. The image input may include a projector for projecting the light onto the selected lenses.

In various embodiments, the image input may be configured to determine the respective first view image, the respective second view image and the respective selected lens based on eye positions of a driver. In an illustrative embodiment, based on the eye positions of the driver, the lenses in one or more rows corresponding to the height of the eye positions may be selected, and the respective first view image and the respective second view image may be determined and projected into the selected lenses only. In a further embodiment, eye movement and gaze (i.e. where the driver is looking at) may be detected or tracked. Based on the detected eye positions and/or eye gaze, the view angle of the driver and the distance of the driver from the display screen 1410 may be determined. The respective first view image and the respective second view image to be displayed may be determined based on one or more of the eye positions, the eye gaze, the view angle and the distance of the driver. In various embodiments, the eye positions and/or the gaze may be detected or tracked by a sensor or a camera installed on top of the display screen 1410, for example.

In various embodiments, the image input is configured to determine the respective first view image, the respective second view image and the respective selected lens further based on a distance of an object from the driver, such that the respective first view image and the respective second view image are superimposed on top of the object seen by the driver. In an illustrative embodiment, based on the distance of the object (e.g. a pedestrian or another car in front of the driver) from the driver, eye focus and view angle of the driver may be determined, and display information at specific point or pixel may be determined to construct the respective first view image and the respective second view image for projecting into the selected lenses, so that the respective first view image and the respective second view image are overlaid on the object with correct view angle and depth perception. In various embodiments, an external camera, such as a time-of-flight (TOF) camera with a TOF sensor, may be included to determine the distance and position of the vehicle against other objects, for example, other vehicles or road markings.

The image input may include a processor configured to determine the respective first view image, the respective second view image and the respective selected lens according to the above embodiments.

According to various embodiments, the image input including the projector and the processor may be a head-up display or a head-mounted display.

Figure 18:
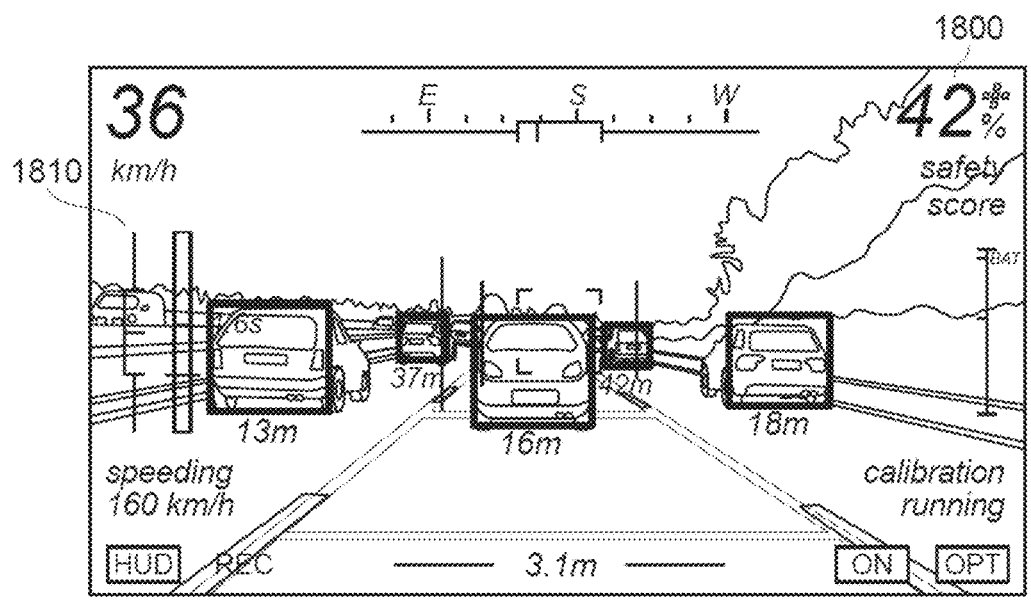
FIG. 18 illustrates an exemplary embodiment of an image displayed on a windscreen.
Figure 19:
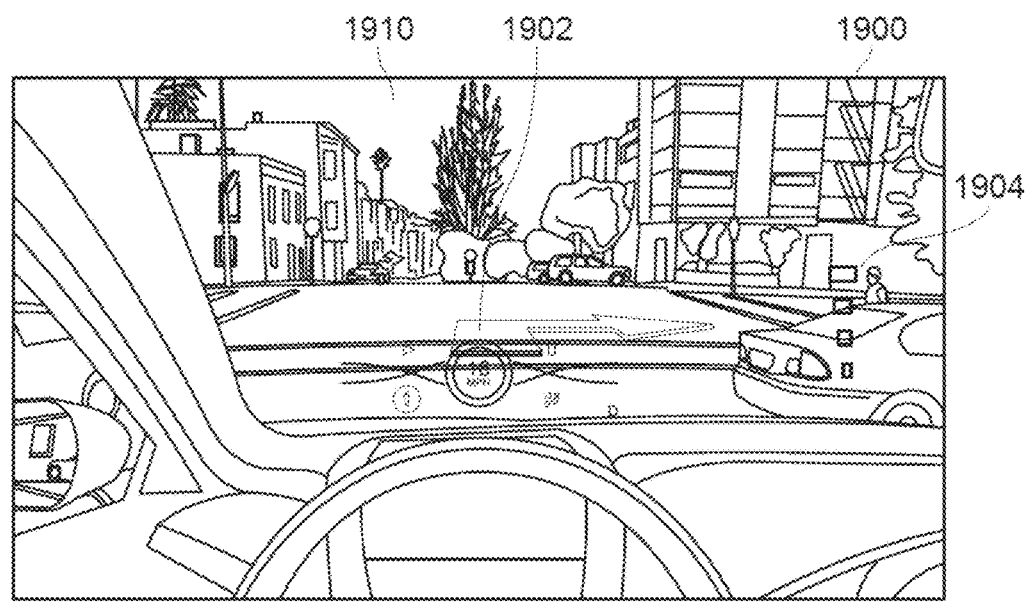
FIG. 19 illustrates an exemplary embodiment of an image displayed on a windscreen.
Figure 20:
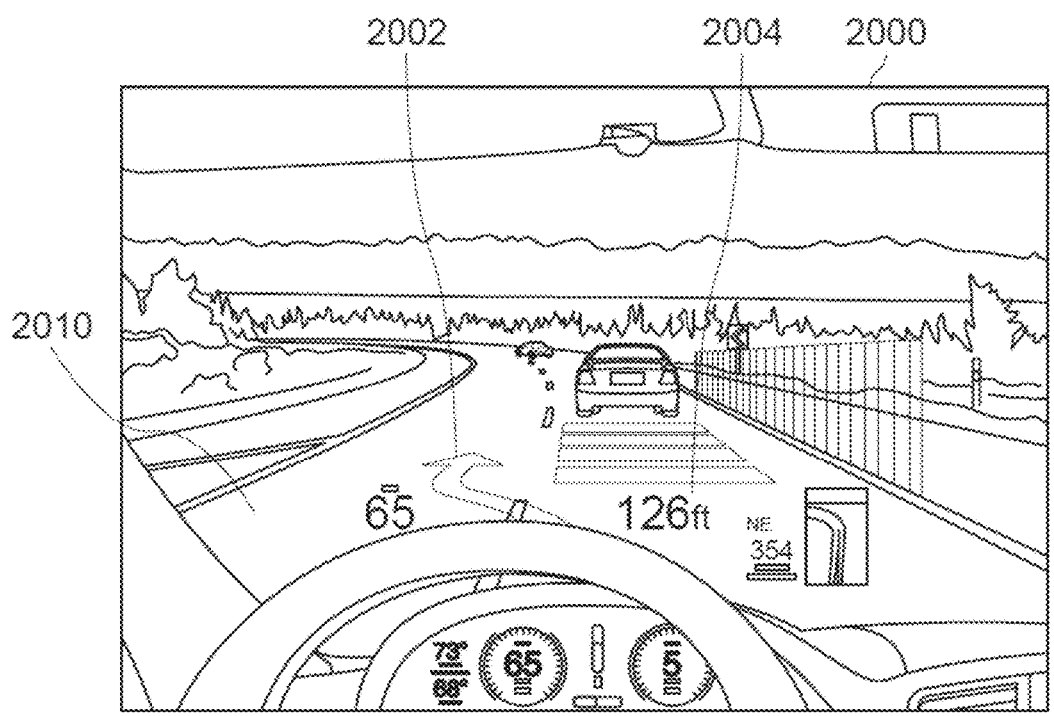
FIG. 20 illustrates an exemplary embodiment of an image displayed on a windscreen.

According to various embodiments, the respective first view image and the respective second view image may include one or more information selected from vehicle position, vehicle marking, navigation, pedestrian warning, driving suggestions, driving information, for example, as shown in FIGS. 18-20 below.

Figure 14B:
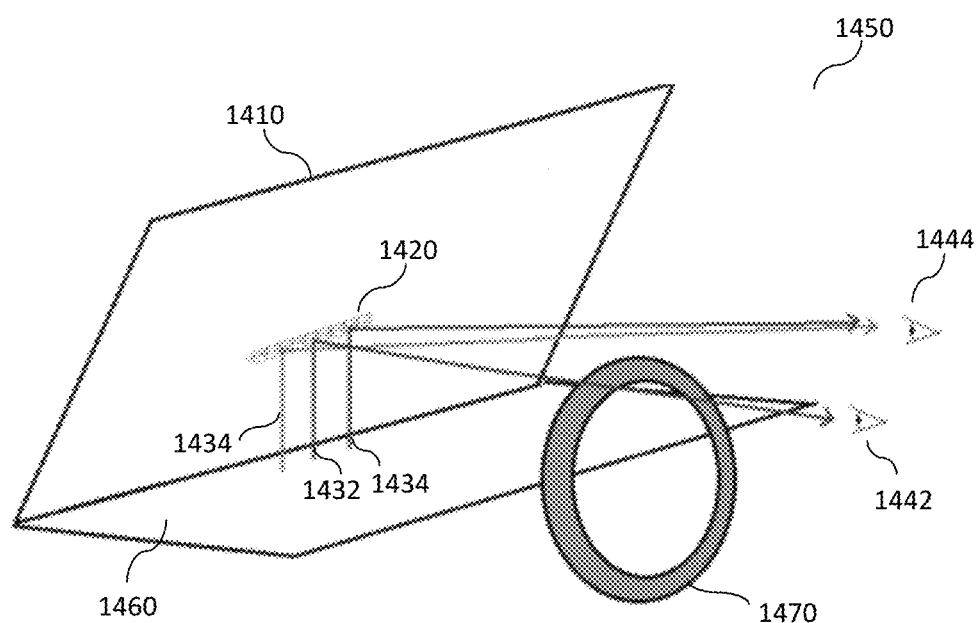
FIG. 14B shows a conceptual diagram of an augmented reality device applied in a vehicle according to various embodiments.
Figure 15:
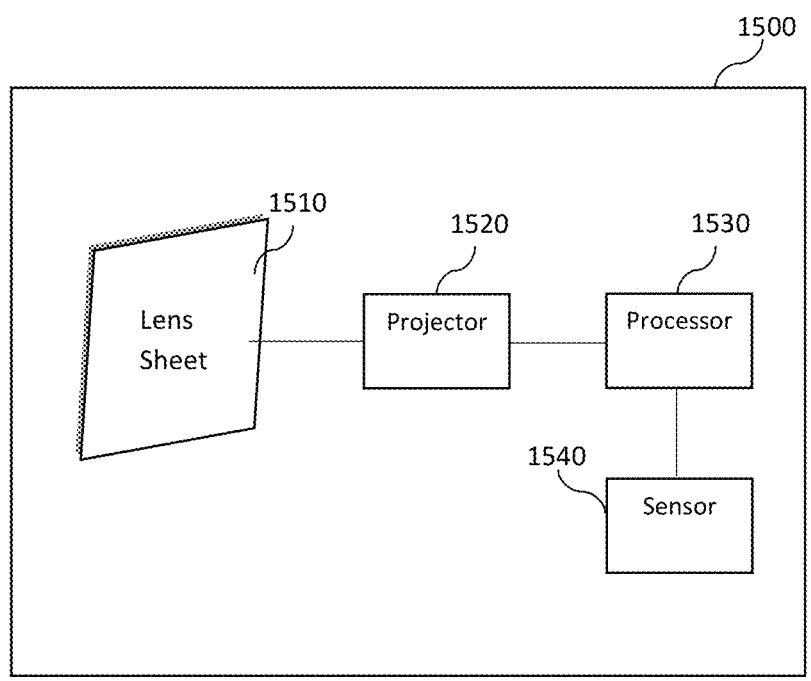
FIG. 15 shows a conceptual diagram of an augmented reality system according to various embodiments.

FIG. 14B shows a conceptual diagram of an augmented reality device 1450 applied in a vehicle according to various embodiments.

In the embodiments shown in FIG. 14B, the augmented reality device 1450 may be or may include a head-up display, which uses the windscreen 1410 (also referred to as windshield) of the vehicle as the display screen, and includes the array of lenses 1420 on the surface of the windscreen 1410 to achieve an autostereoscopic effect and image distortion elimination. Various embodiments described with respect to FIG. 14A above are analogously valid for the embodiments of FIG. 14B, and vice versa.

The image input of the augmented reality device 1450 may include a projector (not shown), for example, located on a dashboard 1460 of the vehicle for projecting the light 1432 of the respective first view image and the light 1434 of the respective second view image onto selected lenses of the lens array 1420. The image input of the augmented reality device 1450 may further include a processor configured to determine the respective first view image, the respective second view image and the respective selected lens based on either eye positions of a driver sitting behind the steering wheel 1470 of the vehicle, or a distance of an object from the driver, or both.

In an illustrative embodiment, the light 1432 of the first view image and the light 1434 of the second view image are projected onto one or more selected lens of the lens array 1420, for example, one or more selected row of the lens array 1420. FIG. 14B shows that the light 1432 and the light 1434 are projected onto different lenses of the lens array 1420 for illustrative purposes only. It is understood that each selected lens may receive both the light 1432 of the first view image and the light 1434 of the second view image, wherein the first view image and the second view image for each lens may be sub-images of a left eye image and a right eye image, as illustrated in FIG. 4 and FIG. 14A above. It is also understood that different selected lenses may receive the light 1432, 1434 of different sub-images. As illustrated in FIG. 14B, the right eye located at the second view region 1444 receive light 1434 refracted from different lenses. The light paths of the lights 1432, 1434 shown in FIG. 14B are for illustrative purposes only, and may not represent the actual light paths of the lights 1432, 1434.

The augmented reality device 1450 utilizes the array of lenses 1420 to redirect lights at a certain angle towards different viewing regions 1442, 1444, thereby creating a 3D illusion which provides accurate placement of augmented image on each eyes of the viewer. The first view region 1442 is the left eye view region of the driver, and the second view region 1444 is the right eye view region of the driver. As shown in FIG. 14B, the left eye image is seen by the left eye at the first viewing region 1442, and the right eye image is seen by the right eye at the second viewing region 1444. In other words, one eye of the driver positioned at the first view region can see the light of the left eye image. Similarly, the other eye of the driver positioned at the second view region can see the light of the right eye image. Thus, each eye of the viewer views a different image or a different set of images. In this manner, when different view images are provided as a left eye image and a right eye image of a stereo pair, depth perception is created and 3D (three-dimensional) illusion is achieved through the array of lenses 1420.

The array of lenses 1420 in FIG. 14B may be any of the lenses described in the embodiments of FIGS. 3-11B above. Although the array of lenses 1420 is shown in FIG. 14B as a one-dimensional array along a row direction, it is understood that the array of lenses 1420 may be arranged in a one-dimensional array along a column direction similar to the embodiments of FIG. 5 above, or may be in a two-dimensional array in rows and columns similar to the embodiments of FIGS. 6A-7B above, in various embodiments.

FIG. 15 shows a conceptual diagram of an augmented reality system 1500 according to various embodiments.

The augmented reality system 1500 may include a lens sheet 1510 including an array of lenses parallel to each other. The lens sheet 1510 may be any of the lens sheets 300, 800, 500, 600, 900, 1000, 1100 described in various embodiments above. Accordingly, various embodiments of the lens sheet described in various embodiments above are analogously valid for the lens sheet 1510, and vice versa.

Each lens includes a light redirecting portion having a light incident surface and a light reflecting surface, and includes a light refracting portion. The light reflecting surface is slanted relative to the light incident surface and relative to a plane interfacing the light redirecting portion and the light refracting portion, such that light of a first view image and light of a second view image transmitted through the light incident surface into the lens are directed to a first region and a second region of the light reflecting surface respectively and are reflected to the light refracting portion by the light reflecting surface. The first region is next to the second region in the light reflecting surface of each lens. The light refracting portion is configured to refract the light of the first view image to a first view region and refract the light of the second view image to a second view region spaced apart from the first view region. The first view region may be the left eye view region of a driver, and the second view region may be the right eye view region of the driver.

The augmented reality system 1500 may further include a projector 1520 configured to project the light of the respective first view image and the light of the respective second view image to a respective selected lens of the array of lenses; and include a processor 1530 configured to determine the respective first view image, the respective second view image and the respective selected lens based on eye positions of a driver. The augmented reality system 1500 may further include a sensor 1540 configured to detect the eye positions of the driver.

According to various embodiments, the lens sheet 1510 and the projector 1520 may be coupled with each other, for example, optically coupled, such that selected lenses of the lens sheet 1510 may receive light projected from the projector 1520.

According to various embodiments, the projector 1520 and the processor 1530 may be coupled with each other, for example, electrically coupled and/or mechanically coupled, such that the projector 1520 is configured to project the light of the respective first view image and the light of the respective second view image to the respective selected lens of the array of lenses based on the input or instruction from the processor 1530.

According to various embodiments, the processor 1530 and the sensor 1540 may be coupled with each other, for example, electrically coupled and/or mechanically coupled, such that the processor 1530 may be configured to determine the respective first view image, the respective second view image and the respective selected lens based on the input from the sensor 1540.

According to various embodiments, the projector 1520 and the processor 1530 may be included in a head-up display or a head-mounted display.

In this context, a "processor", e.g., as described in the embodiments of FIGS. 14A, 14B and 15, may be understood as any kind of a logic implementing entity, which may be special purpose circuitry or a processor executing software stored in a memory, firmware, or any combination thereof. Thus, in an embodiment, a "processor" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "processor" may also be a processor executing software, e.g. any kind of computer program, e.g. a computer program using a virtual machine code such as e.g. Java. Any other kind of implementation of the respective functions which will be described in more detail below may also be understood as a "processor" in accordance with an alternative embodiment.

According to various embodiments, the processor 1530 may be configured to determine the respective first view image, the respective second view image and the respective selected lens based on the eye positions of the driver. In an illustrative embodiment, based on the eye positions of the driver, the lenses in one or more rows corresponding to the height of the eye positions may be selected by the processor 1530, and the respective first view image and the respective second view image may be determined by the processor 1530 and projected by the projector 1520 only into the selected lenses of the lens sheet 1510. In a further embodiment, eye movement and gaze (i.e. where the driver is looking at) may be detected or tracked, e.g. by the sensor 1540. Based on the detected eye positions and/or eye gaze, the view angle of the driver and the distance of the driver from a display screen (e.g. where the lens sheet 1510 may be located) may be determined by the processor 1530. The respective first view image and the respective second view image to be displayed may be determined based on one or more of the eye positions, the eye gaze, the view angle and the distance of the driver. In various embodiments, the eye positions and/or the gaze may be detected or tracked by the sensor 1540 (e.g. a camera) installed at a location on top of the driver, for example.

According to various embodiments, the processor 1530 is configured to determine the respective first view image, the respective second view image and the respective selected lens further based on a distance of an object from the driver, such that the respective first view image and the respective second view image are superimposed on top of the object seen by the driver. In an illustrative embodiment, based on the distance of the object (e.g. a pedestrian or another car in front of the driver) from the driver, the processor 1530 may be configured to determine eye focus and view angle of the driver, and determine display information at specific point or pixel to construct the respective first view image and the respective second view image for projecting into the selected lenses, so that the respective first view image and the respective second view image can be overlaid on the object with correct view angle and depth perception.

In various embodiments, the augmented reality system 1500 may include a further sensor (e.g. 1604 shown in FIG. 16 below) configured to detect a distance of an object from the driver. The further sensor may be an external camera, such as a time-of-flight (TOF) camera with a TOF sensor, configured to determine the distance and position of the vehicle from other objects, for example, other vehicles or road markings.

According to various embodiments, the respective first view image and the respective second view image may include one or more information selected from vehicle position, vehicle marking, navigation, pedestrian warning, driving suggestions, driving information, for example, as shown in FIGS. 18-20 below.

According to various embodiments, the lens sheet 1510 may be configured to be attached on a display screen, for example, a windscreen of a vehicle, a combiner of a head-up display, or a display element of a head-mounted display.

Figure 16:
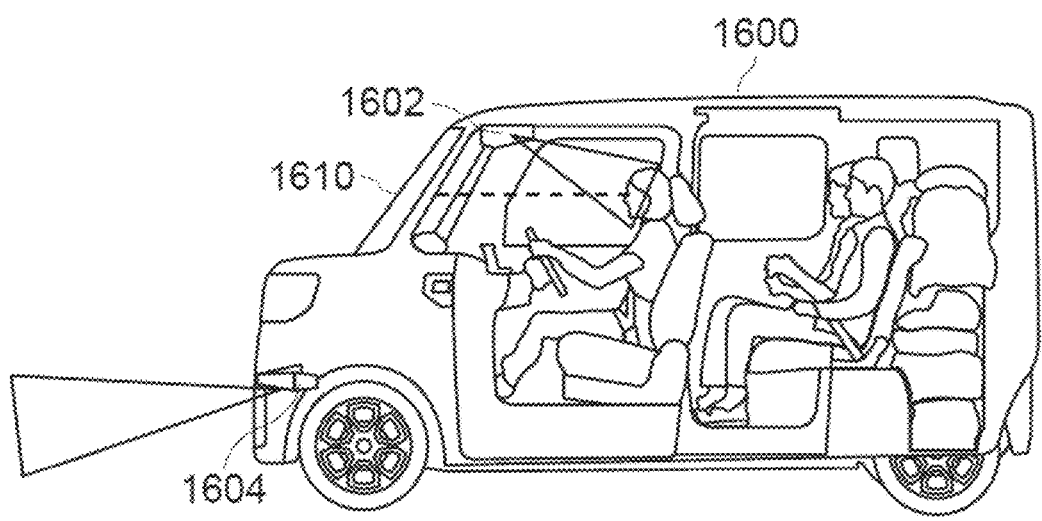
FIG. 16 shows a car in which an augmented reality device according to various embodiments may be applied.

FIG. 16 shows a car 1600 in which an augmented reality device or system according to various embodiments may be applied.

In various embodiments, the augmented reality device 1400, 1450 described in FIGS. 14A and 14B, or the augmented reality system 1500 described in FIG. 15, may be applied in the car 1600. The augmented reality device or system may include a head-up device (HUD) placed on the dashboard of the car 1600 (not shown in FIG. 16). In this illustrative embodiments, the augmented reality device or system uses the windscreen 1610 of the car 1600 as a display screen, and uses the array of lenses (e.g. the array of lenses 1420 shown in FIGS. 14A and 14B) arranged on the windscreen 1610 for 3D stereoscopy and distortion elimination, as illustrated in FIGS. 14A and 14B above. In other embodiments, the augmented reality device may also use a combiner of the head-up display as a display screen.

As shown in FIG. 16, a sensor or a camera 1602 may be installed on top of the windscreen 1610 for detecting eye positions of the driver. In a further embodiment, the sensor or camera 1602 may further detect and track eye movement and gaze (i.e. where the driver is looking at). Based on the detected eye positions and/or eye gaze, the view angle of the driver and the distance of the driver from the windscreen 1610 may be determined. This eye tracking technology would be able to determine the exact position of the driver's eye and/or head, and in turn may be used to control the correct 3D image (e.g. including left eye image and right eye image) for displaying by the head-up device on the windscreen 1610. The augmented reality device or system may include a processor configured to determine the respective first view image, the respective second view image and the respective selected lens based on the eye positions and/or the gaze. The respective first view image and the respective second view image to be displayed may be determined based on one or more of the eye positions, the gaze, the view angle and the distance of the driver. In an illustrative embodiment, the processor may be configured to determine the lenses in one or more rows corresponding to the height of the eye positions, and determine the respective first view image and the respective second view image for projecting into the selected lenses only.

According to various embodiments, the augmented reality device or system may further include a projector configured to project light of the respective first view image and light of the respective second view image to the respective selected lens of the array of lenses on the windscreen 1610.

In various embodiments, an external camera, for example, a time-of-flight (TOF) camera 1604 with a TOF sensor, may be provided externally to the car 1600, to determine the distance and position of the vehicle against other objects, for example, other vehicles or road markings. In various embodiments, the processor of the augmented reality device or system may be configured to determine the respective first view image, the respective second view image and the respective selected lens further based on the distance of an object from the driver, such that the respective first view image and the respective second view image are superimposed on top of the object seen by the driver. In an illustrative embodiment, based on the distance of the object (e.g. another car or pedestrian in front of the driver) from the driver, eye focus and view angle of the driver may be determined, and display information at specific point or pixel may be determined to construct the respective first view image and the respective second view image for projecting into the selected lenses, so that the respective first view image and the respective second view image are overlaid on the object with correct view angle and depth perception.

The sensor/camera 1602 and the external camera 1604 may be provided as components of the augmented reality device (e.g. device 1400, 1450 of FIGS. 14A and 14B) described above, or may be provided separately to cooperate with the augmented reality device.

According to various embodiments above, the array of lenses with the features discussed above are able to redirect light coming from the head-up display (e.g. the image input of the head-up display) to create depth perception for an immersive augmented reality experience. In an embodiment, the lenses may be formed in a nanoimprinted film, and application of the nanoimprinted film on the windshield can easily modify the windshield surface. The lens array of various embodiments above can thus be easily applied to currently existing windshield.

Various embodiments above further make use of eye tracking technology for tracking head and eye position of the driver which in turn help to readjust the images from the head-up display to be displayed at correct angles.

Various embodiments above further use an external TOF camera to capture images and distances of objects in front of the vehicle, and the image to be overlaid on the objects at correct position and angle can be determined.

The sensor/camera 1602, the external camera 1604 and the augmented reality device described above may together form a system for augmented reality, which may be a head-up display (HUD) system.

Figure 17:
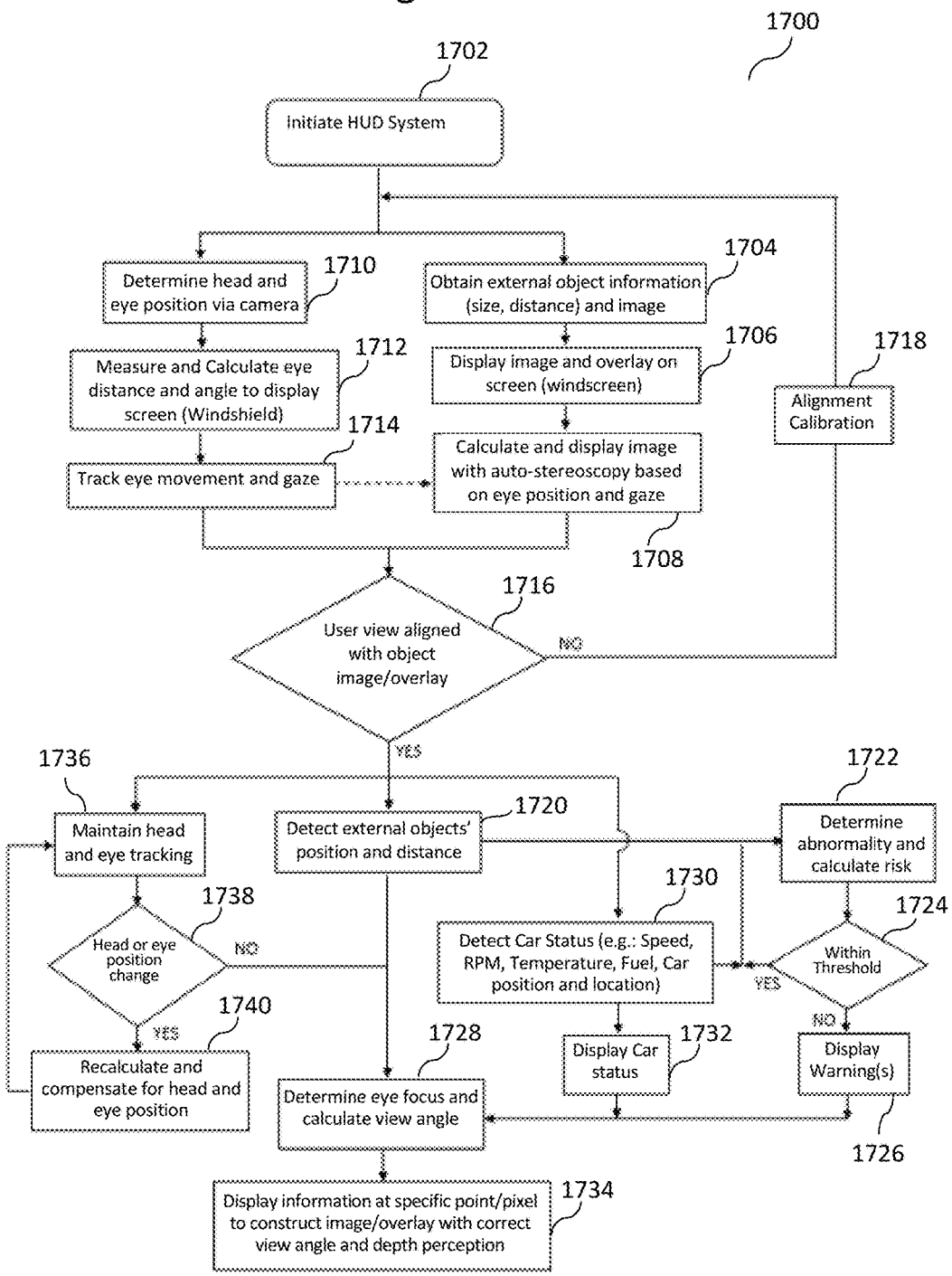
FIG. 17 shows a process flow carried out by a head-up display (HUD) system according to various embodiments.

FIG. 17 shows a process flow 1700 carried out by a head-up display (HUD) system according to various embodiments. The head-up display system may include the augmented reality device 1400, 1450 or the augmented reality system 1500 described above, and may include the camera 1602 for eye tracking, and the external camera 1604 for object detection.

After the HUD system is initiated at 1702, the HUD system obtains external object information (e.g., size and/or distance of an external object) through the external camera 1604, and obtains an image to be displayed (e.g. image including augmented information, also referred to as an augmented image, which may be a stereoscopic image comprising a left eye image and a right eye image) at 1704. At 1706, the HUD system displays the obtained image and overlays the image on the display screen, e.g. the windscreen. At 1708, the HUD system may further calculate and display the image with autostereoscopy based on eye positions and gaze of the driver. The eye positions and gaze of the driver may be determined according to the processes 1710, 1712 and 1714, which may be carried out simultaneously with the process 1704 for obtaining the external object information and the image.

At 1710, head and eye positions may be determined via a camera, for example, the camera 1602 shown in FIG. 16 above. The HUD system may measure and calculate eye distance and angle to the display screen at 1712, for example, based on the detected head and eye positions. The HUD system may further track eye movement and gaze at 1714. The detected eye positions and gaze may be provided to the process 1708 for determining the image to be displayed.

At 1716, the HUD system may judge whether the user view (e.g. the view of the driver) is aligned with the displayed image and an external object seen by the driver, for example, whether the image is overlaid on the external object. If not, an alignment calibration is carried out at 1718, and the process flow goes back to the processes 1704 and 1710 to adjust the image to be displayed.

If it is judged at 1716 that the user view is aligned with the displayed image and the external object, the HUD system may continue to detect the position and the distance of the external object at 1720, which may be carried out periodically or in real-time.

At 1722, the HUD system may determine abnormality and calculate risk. If it is determined at 1724 that the abnormality and risk is not within a threshold, the HUD system may decide to display warnings at 1726.

At 1728, the eye focus may be determined and the view angle may be calculated based on the positions and distance of the external object detected at 1720.

Simultaneously with the process 1720, the HUD system may further detect car status, for example, speed, revolutions per minute (RPM), temperature, fuel, position, location of the car, at 1730. The HUD system may decide to display car status at 1732.

Based on the eye focus and view angle determined at 1728, the HUD system may display information at specific point or pixel to construct the image overlaid with the external object with correct view angle and depth perception at 1734. The information to be displayed may be the warnings decided at 1726, or the car status determined at 1732, or both.

Simultaneously with the process 1720, the HUD system may maintain head and eye tracking at 1736. It is judged at 1738 whether the head or eye position is changed. If no change has been detected, the process proceed to 1728. If change has been detected, the HUD system will recalculate the image to be displayed to compensate for the change of the head or eye position.

Based on the HUD system described above, augmented information can be correctly displayed to the driver at correct positions on top of the external object in a dynamic manner.

According to various embodiments, the image to be displayed, including the respective first view image and the respective second view image described above, may include one or more information selected from vehicle position, vehicle marking, navigation, pedestrian warning, driving suggestions, driving information. These information may be referred to as augmented information, as shown in FIGS. 18-20 below.

FIG. 18 illustrates an exemplary embodiment of an image 1800 displayed on a windscreen 1810. As shown in FIG. 18, vehicle positions, e.g. 13 m (13 meters), 16 m, 18 m, 37 m, 42 m from the driver, are displayed in the image 1800. Vehicle marking is also shown via the respective boxes encompassing the respective vehicle.

FIG. 19 illustrates an exemplary embodiment of an image 1900 displayed on a windscreen 1910. As shown in FIG. 19, navigation 1902 and pedestrian warning 1904 are displayed in the image 1900.

FIG. 20 illustrates an exemplary embodiment of an image 2000 displayed on a windscreen 2010. As shown in FIG. 20, driving suggestions 2002 and driving information 2004 are displayed in the image 2000.

According to various embodiments above, a true immersive driving experience can be realized, through application of autostereoscopy and 3D imaging achieved from the lens structure described in various embodiments above. Based on the lens structure, the augmented reality device of various embodiments above achieves the advantages that images can be placed accurately and without distortion onto the objects on the road.

While embodiments of the invention have been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced. It will be appreciated that common numerals, used in the relevant drawings, refer to components that serve a similar or the same purpose.

What is claimed is:

1. A lens sheet, comprising:
an array of lenses,
wherein each lens comprises:
a light redirecting portion, and
a light refracting portion,
wherein the light redirecting portion is configured to receive light of first view image and light of second view image and redirect the light of the first view image and the light of the second view image to the light refracting portion,
wherein the light refracting portion is configured to refract the light of the first view image to a first view region and refract the light of the second view image to a second view region spaced apart from the first view region, and
wherein the first view region is a left eye view region of a driver, and the second view region is a right eye view region of the driver.

2. The lens sheet according to claim 1,
wherein the light refracting portion comprises a convex surface configured to refract the light of the first view image to the first view region, and refract the light of the second view image to the second view region.

3. The lens sheet according to claim 2,
wherein the light of the first view image and the light of the second view image are reflected onto different regions of the convex surface.

4. The lens sheet according to claim 1,
wherein the light refracting portion is a lens portion in at least one of a partially cylindrical shape, a partially polygonal prism shape, a triangular prism shape, or a partially spherical shape.

5. The lens sheet according to claim 1,
wherein the array of lenses are arranged in a one-dimensional array or a two-dimensional array.

6. The lens sheet according to claim 1,
wherein the array of lenses are arranged with space between each other.

7. An augmented reality device, comprising:
an array of lenses, and
an image input configured to project light of a first view image and light of a second view image to a selected lens of the array of lenses; and
a processor connected to the image input,
wherein each lens comprises:
a light redirecting portion, and
a light refracting portion,
wherein the light redirecting portion is configured to receive the light of first view image and the light of second view image and redirect the light of the first view image and the light of the second view image to the light refracting portion,
wherein the light refracting portion is configured to refract the light of the first view image to a first view region and refract the light of the second view image to a second view region spaced apart from the first view region, and
wherein the processor is configured to determine the respective first view image, the respective second view image and the respective selected lens based on eye positions of a driver.

8. The augmented reality device according to claim 7,
wherein the array of lenses are formed as a lens sheet, and the lens sheet is arranged on a surface of a display screen.

9. The augmented reality device according to claim 8,
wherein the display screen is a transparent screen.

10. The augmented reality device according to claim 8,
wherein the display screen is one of a windscreen of a vehicle, a combiner of a head-up display, or a display element of a head-mounted display.

11. The augmented reality device according to claim 7,
wherein the image input is configured to determine the respective first view image, the respective second view image and the respective selected lens further based on a distance of an object from the driver, such that the respective first view image and the respective second view image are superimposed on top of the object seen by the driver.

12. The augmented reality device according to claim 7, wherein the first view region is a left eye view region of the driver, and the second view region is a right eye view region of the driver.

13. The augmented reality device according to claim 7, wherein the first view image and the second view image comprise one or more information selected from vehicle position, vehicle marking, navigation, pedestrian warning, driving suggestions, driving information.

14. An augmented reality system, comprising:
a lens sheet including an array of lenses,
wherein each lens comprises:
 a light redirecting portion,
 a light refracting portion,
wherein the light refracting portion is configured to refract a light of the first view image to a first view region and refract a light of the second view image to a second view region spaced apart from the first view region;
an image input configured to project the light of the respective first view image and the light of the respective second view image to a respective selected lens of the array of lenses;
a sensor configured to detect a distance of an object to a driver; and
a processor configured to determine the respective first view image, the respective second view image and the respective selected lens based on the distance of the object from the driver.

15. The augmented reality device according to claim 14, wherein the processor is configured to determine the respective first view image, the respective second view image and the respective selected lens further based on a distance of an object from the driver, such that the respective first view image and the respective second view image are superimposed on top of the object seen by the driver.

\* \* \* \* \*